(12) United States Patent
Vecchini et al.

(10) Patent No.: US 10,016,823 B2
(45) Date of Patent: Jul. 10, 2018

(54) MACHINE FOR MACHINING A MOVING OBJECT

(71) Applicant: FIVES OTO S.P.A., Boretto (Reggio Emilia) (IT)

(72) Inventors: Gianluca Vecchini, Parma (IT); Andrea Anesi, Sant'Ilario d'Enza (IT)

(73) Assignee: FIVES OTO S.P.A., Boretto (IT)

( * ) Notice: Subject to any disclaimer, the term of this patent is extended or adjusted under 35 U.S.C. 154(b) by 140 days.

(21) Appl. No.: 14/688,013

(22) Filed: Apr. 16, 2015

(65) Prior Publication Data

US 2015/0321368 A1  Nov. 12, 2015

(30) Foreign Application Priority Data

May 7, 2014  (IT) .............................. MI2014A0832

(51) Int. Cl.
| | | |
|---|---|---|
| *B23D 25/02* | (2006.01) | |
| *B23D 25/04* | (2006.01) | |
| *B23D 21/00* | (2006.01) | |

(52) U.S. Cl.
CPC ............. *B23D 25/02* (2013.01); *B23D 25/04* (2013.01); *B23D 21/00* (2013.01); *Y10T 83/0515* (2015.04); *Y10T 83/4653* (2015.04)

(58) Field of Classification Search
CPC ........ B23D 25/02; B23D 25/04; B23D 21/00; B26D 1/60; Y10T 83/0515; Y10T 83/4757; B23Q 15/00
USPC ............................................ 83/318; 700/188
See application file for complete search history.

(56) References Cited

U.S. PATENT DOCUMENTS

| | | | |
|---|---|---|---|
| 3,340,756 A | | 9/1967 | Mize |
| 4,350,065 A | * | 9/1982 | Hayashi ................. B23D 25/04 700/160 |
| 2004/0187665 A1 | | 9/2004 | Chezzi |

FOREIGN PATENT DOCUMENTS

| | | | | |
|---|---|---|---|---|
| DE | 19504152 A1 | * | 8/1996 | ............. B23D 25/04 |
| DE | 19750322 A1 | * | 5/1998 | ......... B23D 36/0058 |
| EP | 0614733 A1 | | 9/1994 | |
| EP | 1462200 A1 | | 9/2004 | |
| JP | 57107723 A | * | 7/1982 | ............. B23D 25/04 |
| JP | 59146712 A | * | 8/1984 | ............. B23D 25/04 |
| JP | 10146717 A | * | 6/1998 | ......... B23D 36/0058 |

OTHER PUBLICATIONS

English Translation of DE19504152.*

* cited by examiner

*Primary Examiner* — Jennifer Swinney
(74) *Attorney, Agent, or Firm* — Pearne & Gordon LLP

(57) ABSTRACT

A machine for cutting a moving object comprises a conveyor belt for carrying the object along an advancement direction at a line speed and comprises a driving and cutting unit configured to move in a cutting cycle according to a forward phase in order to perform the cutting of the moving object, and configured to move according to a return phase in order to return into the initial position of the cutting cycle. The cutting machine further comprises a processing unit configured to generate a driving signal for controlling the movement of the driving and cutting unit with an acceleration trend wherein the maximum absolute value of the acceleration within the return phase is smaller than the maximum absolute value of the acceleration within the forward phase.

8 Claims, 11 Drawing Sheets

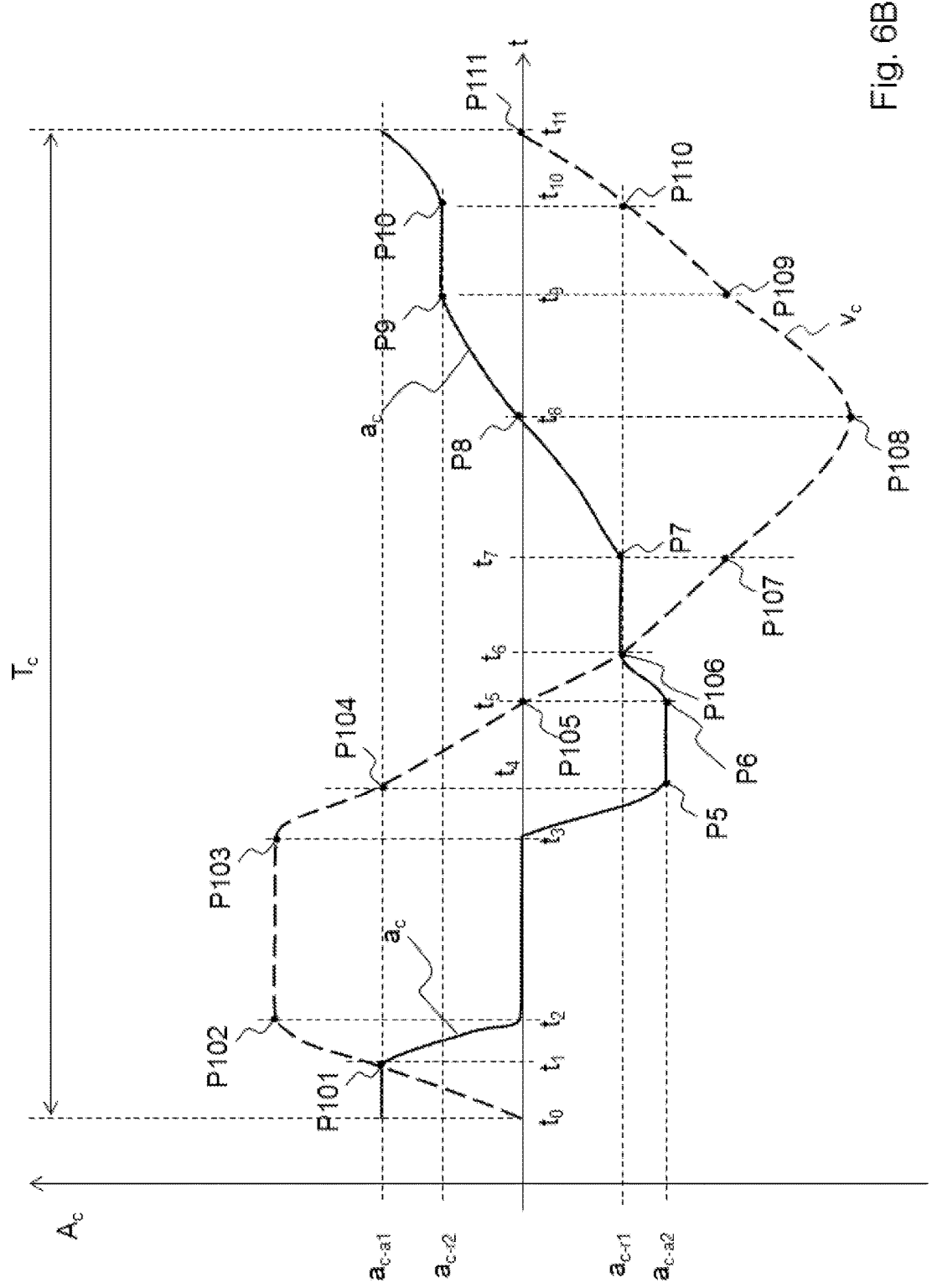

MACHINE FOR MACHINING A MOVING OBJECT

BACKGROUND

Technical Field

The present disclosure generally relates to a machine for machining a moving object. More in particular, the present disclosure relates to a machine for continuous-cycle cutting of metal bars, such as, for example, steel tubes.

Description of the Related Art

Machines for continuous-cycle cutting of tubes are known, i.e. machines which cut tubes of the desired length while the tubes themselves are moving. A continuous-cycle cutting machine comprises means for conveying the tube to be cut along an advancement direction and comprises a slide that moves along a forward and return direction parallel to the advancement direction. The slide supports a cutting device. The conveyor means are for example a conveyor belt, while the cutting device is for example a milling cutter.

The slide travels in a forward stroke until arriving in the proximity to the tube in the position calculated for cutting it, then it is synchronized with the conveyor means moving at the same speed as the speed of the tube moving on the conveyor means: in this condition the cutting device performs the cut of the tube in a direction that is perpendicular (or, more in general, inclined) with respect to the advancement direction.

European patent number 1462200 describes a machine for continuous-cycle cutting of welded tubes. The cutting machine comprises a microprocessor controlling (by means of driving means) the cutting slide such that the latter has an acceleration A' with a law of motion in the cutting cycle which is a derivable function, as shown schematically in FIG. 1 with a dashed line. Moreover, a sinusoidal (or 7th degree polynomial) speed trend V' of the slide is used for the connecting portions between the acceleration value $A'=a_c'$ (greater than zero) and A' equal to zero and between the acceleration value A' equal to zero and $A'=-a_c'$ (smaller than zero), as schematically shown in FIG. 1 with a solid line. Moreover, it is possible to observe that the maximum absolute value of the acceleration/deceleration in the forward phase (see the time instants comprised between $t_0'$ and $t_1'$ and between $t_4'$ and $t_5'$) is equal to the maximum absolute value of the acceleration/deceleration in the return phase (time instants comprised between $t_5'$ and $t_6'$ and between $t_{10}'$ and $t_{11}'$): this maximum absolute value has been indicated in FIG. 1 as $a_c'$.

The Applicant has observed that in patent EP 1462200 the maximum absolute value of the acceleration/deceleration of the cutting slide in the return phase (see for example the value $-a_c'$ of point P3 and the value $a_c'$ of point P4 of the dashed curve in FIG. 1) is such as to cause accelerations and decelerations of the cutting slide which are not optimized; consequently, the moving parts of the cutting machine undergo mechanical stresses which cause wear of the moving parts, thus reducing the reliability of the cutting machine.

BRIEF SUMMARY

The present disclosure relates to a machine for machining a moving object as defined in the enclosed claim 1 and by its preferred embodiments disclosed in the dependent claims from 2 to 8.

The Applicant has perceived that the machine for machining a moving object according with the present disclosure can reduce the maximum absolute value of the acceleration and deceleration of the cutting slide in the return phase, thereby reducing the mechanical stresses of the moving parts of the machine and thus reducing the wear thereof, thus improving the reliability of the machine.

One embodiment of the present disclosure is a method for machining a moving object as defined in the enclosed claim 9.

Another embodiment of the present disclosure is a computer program as defined in the enclosed claim 10.

BRIEF DESCRIPTION OF THE SEVERAL VIEWS OF THE DRAWINGS

Further features and advantages of the disclosure will become more apparent from the description which follows of a preferred embodiment and the variants thereof, provided by way of example in the appended drawings, wherein:

FIG. 6B schematically shows the trend of the acceleration (solid line) and of the speed (dashed line) of the cutting slide in the cutting cycle of the cutting machine according to the second embodiment of the disclosure;

DETAILED DESCRIPTION

It should be observed that in the present description, identical or analogous components or modules are indicated in the figures with the same numerical references.

It should be further observed that dimensions of the drawings are not drawn to scale and that the content of the description takes the precedence over dimensions taken from drawings.

Figure 2:
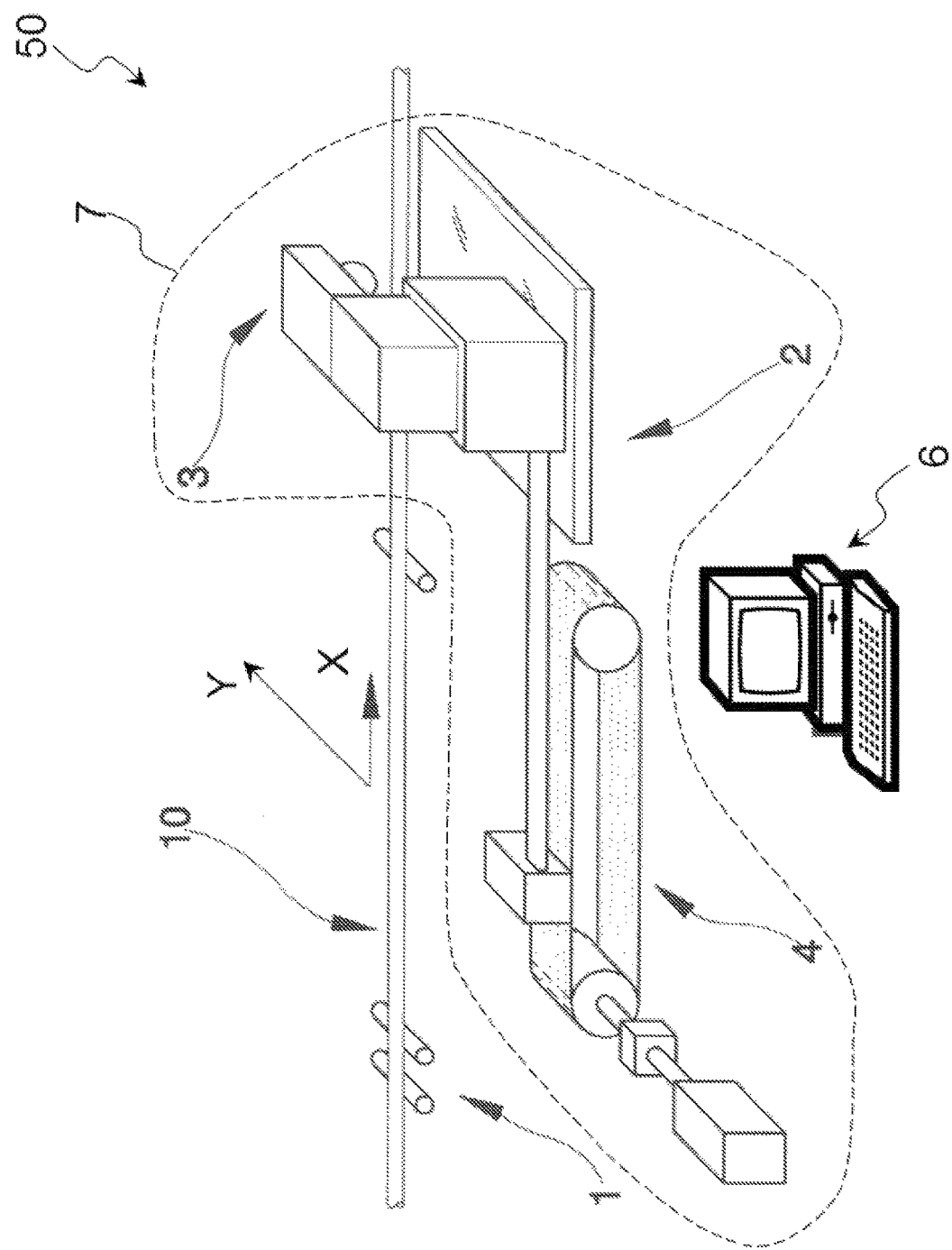
FIG. 2 schematically shows a machine for continuous-cycle cutting of metal tubes according to the disclosure.

With reference to FIG. 2, it shows a machine 50 for continuous-cycle cutting of a metal tube 10. The machine 50 performs a continuous-cycle cutting of the metal tube 10, that is the cut is performed while the tube 10 itself is moving along an advancement direction X.

The machine 50 comprises:

conveyor means 1 for continuously conveying a tube 10 in the advancement direction X, at a substantially constant speed indicated hereinafter with line speed $V_l$;

a driving and cutting unit 7 having the function of performing the cut of the tube 10 in a direction Y which is substantially perpendicular (or, more in general, inclined) with respect to the advancement direction X, in order to obtain a plurality of cut tubes having a cutting length $L_{prod}$;

a processing unit 6 having the function of controlling the driving and cutting unit 7 in an appropriate manner so as to obtain the cut tubes reducing the mechanical stresses to which the driving and cutting unit 7 are subjected, as it will be explained in greater detail below.

For the purpose of explaining the disclosure, it will be considered below a driving and cutting unit 7 implemented with a cutting slide 2 that moves with a reciprocating linear motion along a direction parallel to the advancement direction X and with driving means 4 that drive the movement of the cutting slide 2. The cutting slide 2 supports cutting means 3, which are configured to perform the cutting of the tube 10 in the direction Y, which is substantially perpendicular with respect to the advancement direction X, in such a way as to form cut tubes having the cutting length $L_{prod}$. Moreover, conveyor means 1 made with a conveyor belt will be considered.

Figure 3:
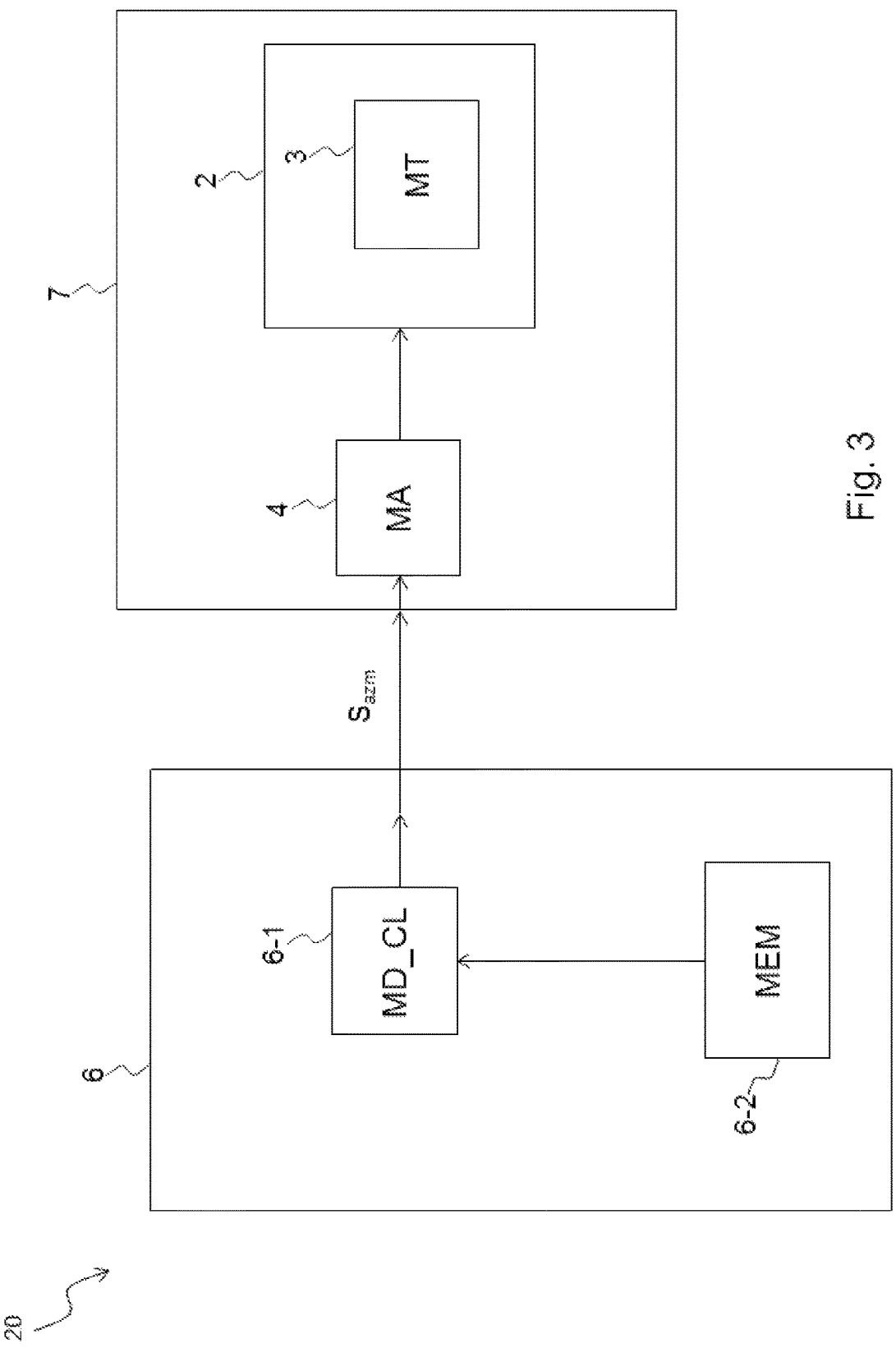
FIG. 3 shows the block diagrams of the control system positioned in the cutting machine of FIG. 2.

With reference to FIG. 3, it shows a block diagram of an electronic system 20 for controlling the cutting of the tube 10 according to the disclosure.

The electronic system 20 comprises the processing unit 6 and the driving and cutting unit 7.

The processing unit 6 is configured to calculate an appropriate trend of a speed $V_c$ of the cutting slide 2 and of an acceleration $A_c$ of the cutting slide 2, as it will be explained below in the description of FIGS. 4A-B, 6A-B and 8.

Moreover, the processing unit 6 is configured to generate a driving signal $S_{azm}$ which controls the driving means 4 so as to move the cutting slide 2 with said trend of the speed Vc and of the acceleration Ac, in order to reduce the mechanical stresses of the driving means 4 and of the cutting slide 2.

More in particular, the processing unit 6 is configured to calculate the trend of the speed $V_c$ of the cutting slide 2 (and thus generate the driving signal $S_{azm}$) as a function of the following input configuration parameters:

usable slide stroke $L_{ut}$: it indicates the maximum distance that the cutting slide 2 can travel in the direction parallel to the advancement direction X and it is fixed on the basis of the space occupied by the cutting machine 50;

maximum acceleration $A_{c\_max}$: it indicates the maximum value of acceleration that the cutting slide 2 can have and it is fixed on the basis of the technology used for the driving means 4 and for the cutting slide 2;

maximum speed $V_{c\_max}$: it indicates the maximum value of the speed that the cutting slide 2 can have and it is fixed on the basis of the technology used for the driving means 4 and for the cutting slide 2;

cutting length $L_{prod}$; it indicates the value of the desired length of the cut tubes and it is an input value which can be modified;

cutting time $T_s$: it indicates the time it takes to cut the tube 10 and it is an input value which can be modified as a function of the properties of the tube 10 (for example, the thickness of the tube 10 having a cylindrical shape and the type of material used for the tube 10).

For example, $L_{ut}$=3.5 meters, $A_{c\_max}$=12 meters/s$^2$, $V_{c\_max}$=240 meters/minute, $L_{prod}$=6 meters and $T_s$=0.686 seconds.

The driving means 4 are configured to receive from the processing unit 6 the driving signal $S_{azm}$ and are configured to control, as a function of the value of the driving signal $S_{azm}$, the movement of the cutting slide 2 so as to perform the cutting of the tube 10 in the direction Y perpendicular to the advancement direction X, in order to form cut tubes of a length equal to the cutting length $L_{prod}$.

The processing unit 6 is for example a personal computer or a dedicated micro-controller which is positioned inside the cutting machine 50.

It should be observed that in the present description the processing unit 6 is presented as divided into distinct functional modules (memory modules or operating modules) for the sole purpose of describing the functions thereof in a clear and complete manner. In reality, the processing unit 6 can consist in a single electronic device duly programmed to perform the functions described, and the various modules can correspond to hardware entities and/or to software routine belonging to the programmed device. Alternatively, or in addition, these functions can be performed by a plurality of electronic devices over which the aforesaid functional modules can be distributed. The processing unit 6 can moreover rely on one or more processors to execute the instructions contained in the memory modules. The aforesaid functional modules can moreover be distributed over several local or remote computers according to the architecture of the network they reside in.

More in particular, the processing unit 6 comprises a calculating module 6-1 and a memory 6-2.

The memory 6-2 is structured to store the values of the input configuration parameters, in particular:

usable slide stroke $L_{ut}$;
maximum speed $V_{c\_max}$;
maximum acceleration $A_{c\_max}$;
cutting length $L_{prod}$;
cutting time $T_s$.

The calculating module 6-1 is configured to read from the memory 6-2 the value of the usable slide stroke $L_{ut}$, the value of the maximum speed $V_{c\_max}$, the value of the maximum acceleration $A_{c\_max}$, the value of the cutting length $L_{prod}$ and the value of the cutting time $T_s$, is configured to calculate the value of an available space $S_d$ indicating the value of the available space for the cutting slide 2 in the return phase with a rectilinear motion in a direction opposite the advancement direction X, is configured to calculate, as a function of the values read from the memory 6-2 and of the value of the available space $S_d$, the trend in a cutting cycle having length $T_c$ of the speed $V_c$ and of the acceleration $A_c$ of the cutting slide 2 in the forward and return phases as shown by the solid lines in FIGS. 4A-B, 6A-B and 8, and it is configured to generate the driving signal $S_{azm}$ for controlling the driving means 4 in such as way as to move the cutting slide 2 with a speed $V_c$ and with an acceleration $A_c$ having said calculated trends. It should be observed that the value of the available space $S_d$ is smaller than or equal to the value of the usable slide stroke $L_{ut}$.

The length $T_c$ of the cutting cycle depends on the cutting length $L_{prod}$ indicating the value of the desired length of the cut tubes and on the line speed $V_l$ at which the conveyor means 1 (and the cutting slide 2 synchronized therewith) move in the cutting phase along the advancement direction X (and thus equal to the speed at which the tube 10 moves on the conveyor means 1). In particular, the length $T_c$ of a cutting cycle is calculated with the following formula:

$$T_c = L_{prod}/V_l$$

For example, the value of the cutting length $L_{prod}$ is equal to 6 meters, the value of the line speed $V_l$ is equal to 159.987 meters/minute (which corresponds to 2.67 meters/second) and thus the length of the cycle time $T_c$ is equal to about 2.250 seconds.

The value of the line speed $V_l$ at which the conveyor means 1 move is smaller than the value of the maximum speed $V_{c\_max}$ which the cutting slide 2 can have.

In one embodiment, the value of the line speed $V_l$ is substantially equal to the value of the maximum speed $V_{c\_max}$.

Figure 4A:
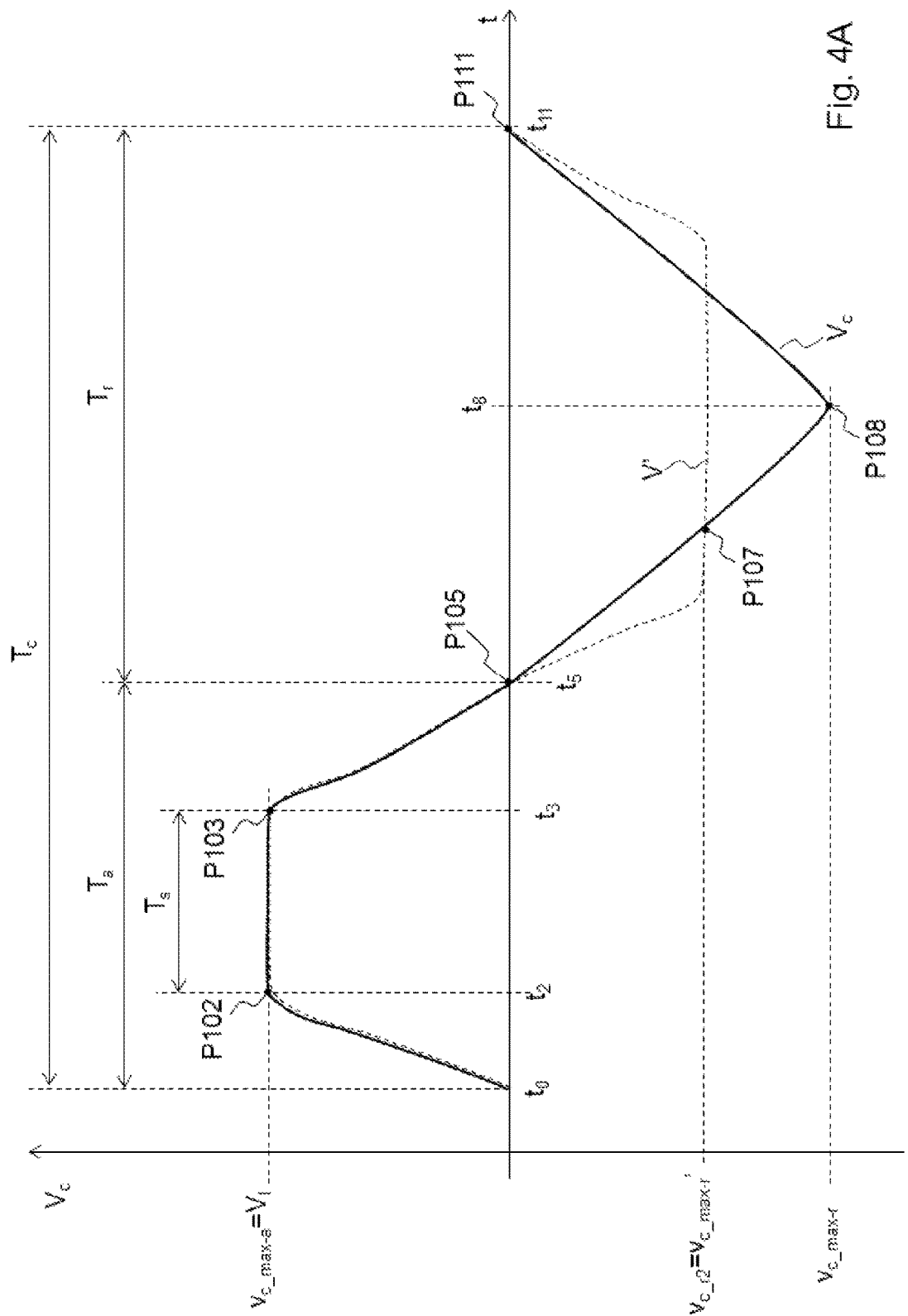
FIG. 4A schematically shows the speed trend of the cutting slide in a cutting cycle of a cutting machine according to a first embodiment of the disclosure (solid line) and according to the prior art (dashed line)
Figure 4B:
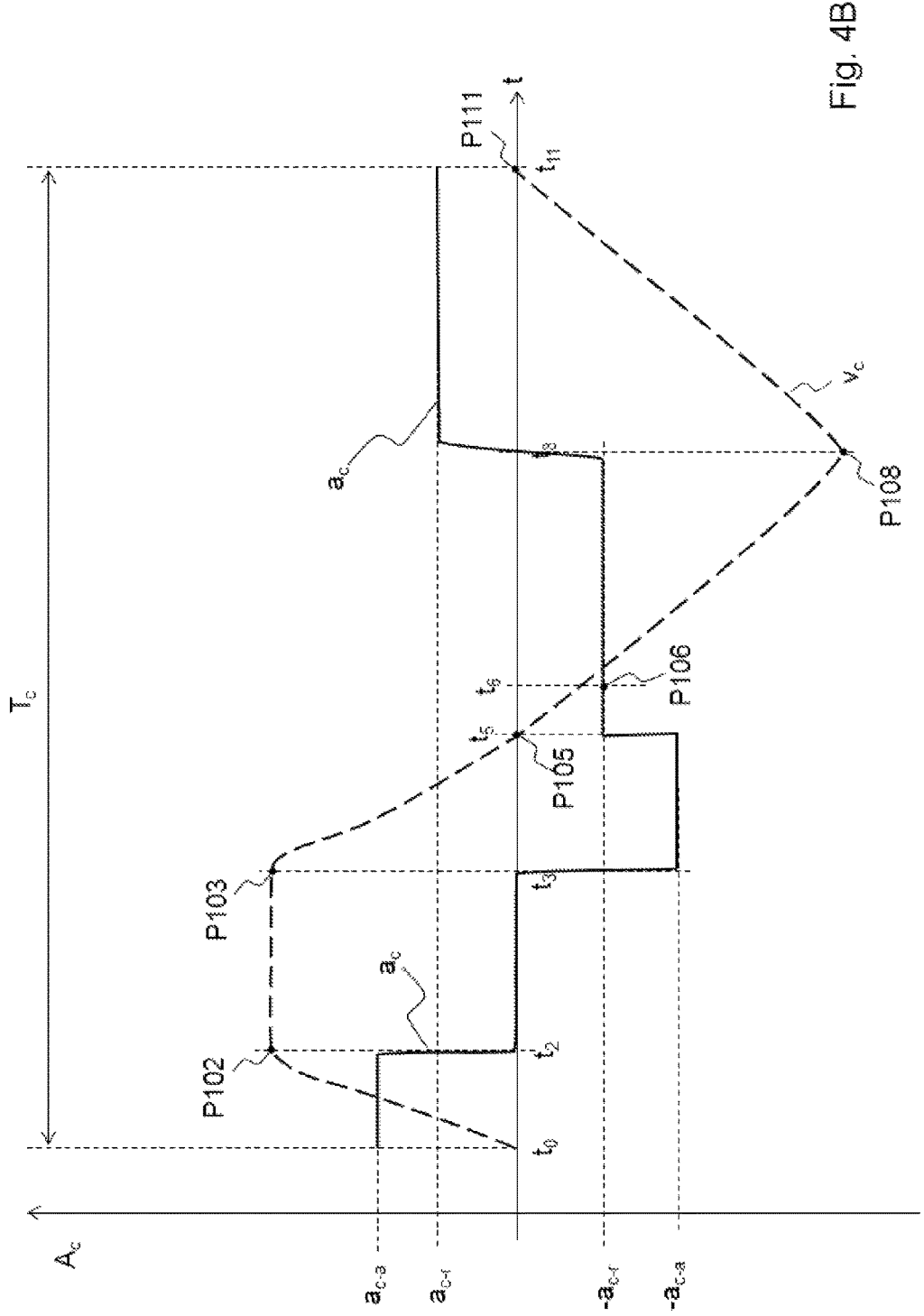
FIG. 4B schematically shows the trend of the acceleration (solid line) and of the speed (dashed line) of the cutting slide in the cutting cycle of the cutting machine according to the first embodiment of the disclosure.

More in particular, with reference to FIG. 4A, it shows with a solid line a possible trend of speed $V_c$ of the cutting slide 2 in a cutting cycle having a length $T_c$ according to a first embodiment of the disclosure and FIG. 4B shows with a solid line $A_c$ a possible trend of the corresponding acceleration of the cutting slide 2 in the same cutting cycle.

It is supposed that the value of the speed $V_c$ of the cutting slide 2 is positive if the movement of the cutting slide 2 along the direction parallel to the advancement direction X is in the same direction as the direction of the movement of the conveyor belt 1 (thus of the tube 10), while it is negative if the movement of the cutting slide 2 is in the opposite direction.

Each cutting cycle comprises the following phases:
a forward phase in a forward time interval $T_a$ comprised between time instants $t_0$ and $t_5$, wherein the direction of the movement of the cutting slide 2 is in the same direction as the movement direction of the conveyor belt 1 (and thus of the tube 10 which moves integrally thereon in the same direction);
a return phase in a return time interval $T_r$ comprised between time instants $t_5$ and $t_{11}$, wherein the direction of the movement of the cutting slide 2 is opposite to the movement direction of the conveyor belt 1 (and thus of the tube 10).

The forward phase is divided in turn into the following sub-phases (that is, time intervals):
a forward phase at a constant acceleration comprised between time instants $t_0$ and $t_2$;
a cutting phase comprised between time instants $t_2$ and $t_3$;
a forward phase at a constant deceleration comprised between time instants $t_3$ and $t_5$.

In the constant acceleration forward phase (comprised between time instants $t_0$ and $t_2$) the cutting slide 2 is structured to move in the same direction as the advancement direction X at a speed $V_c$ linearly increasing from the null value to a value of maximum forward speed $v_{c\_max-a}$ and thus with a substantially constant acceleration $A_c$ equal to a forward acceleration value $a_{c-a}$, as shown by the solid lines in FIG. 4A and FIG. 4B between time instants $t_0$ and $t_2$ respectively. The term "maximum forward speed $v_{c\_max-a}$" means the maximum value that the speed of the cutting slide 1 can have in a same direction as the advancement direction X in the forward phase of the cutting cycle.

At time instant $t_2$ the acceleration $A_c$ has a transition from the forward acceleration value $a_{c-a}$ to the null value.

At time instant $t_2$ the cutting slide is situated in the proximity of the tube 10 with the cutting means 2 positioned above it in the position calculated for cutting the tube 10 at the cutting length $L_{prod}$.

It should be observed that the value of the maximum forward speed $v_{c\_max-a}$ of the cutting slide 2 is equal to the value of the line speed $V_l$ of the conveyor belt 1 (and thus of the tube 10 positioned thereupon): in this way starting from time instant $t_2$ the movement of the cutting slide 2 is synchronized with the movement of the conveyor belt 1 and thus of the tube 10. In one embodiment, the value of the line speed $V_l$ is equal to the value of the maximum speed $V_{c\_max}$ which the cutting slide 2 can have.

In the cutting phase (having a length $T_S$ comprised between time instants $t_2$ and $t_3$) the cutting slide 2 continues to have a rectilinear movement in the same direction as the advancement direction X and it is synchronized with the movement of the tube 10, i.e. the cutting slide 2 moves at a constant speed equal to the value of the maximum forward speed $v_{c\_max-a}$, which is equal to the value of the line speed $V_l$ of the conveyor belt 1 (which is in turn equal to the speed at which the tube 10 moves) and thus with an acceleration $A_c$ having a null value, as shown by the solid lines in FIG. 4A and FIG. 4B respectively between time instants $t_2$ and $t_3$: in this way in the cutting time $T_3$ the cutting means 3 positioned on the cutting slide 2 can cut the tube 10 in one point of the length thereof while it is moving on the conveyor means 1. It should be observed that the cutting of the tube 10 can take place using the whole interval of the cutting time $T_S$ or only a part thereof.

At time instant $t_3$ the acceleration $A_c$ has a transition from the null value to the forward acceleration value $-a_{c-a}$ (i.e. $A_c$ is smaller than zero).

In the constant deceleration forward phase (comprised between time instants $t_3$ and $t_5$) the cutting slide 2 is structured to continue moving in the same direction as the advancement direction X at a speed $V_c$ linearly decreasing from the value of the line speed $V_l$ to the null value (i.e. a reduction of the speed $V_c$) and thus with a constant negative acceleration $A_c$ (because the acceleration $A_c$ has an direction opposite to the direction of the speed $V_c$) equal to the forward acceleration value $-a_{c-a}$, i.e. with a constant deceleration equal to the forward acceleration value $a_{c-a}$, as shown by the solid lines in FIG. 4A and FIG. 4B respectively between time instants $t_3$ and $t_5$; in this way at time instant $t_5$ the speed $V_c$ of the cutting slide 2 has reached the null value (point P105 in FIG. 4A).

The return phase is divided in turn into the following sub-phases (that is, time intervals):
a return phase at a constant acceleration comprised between time instants $t_5$ and $t_8$;
a return phase at a constant deceleration comprised between time instants $t_8$ and $t_{11}$.

At time instant $t_5$ the acceleration $A_c$ has a transition from the forward acceleration value $-a_{c-a}$ to a return acceleration value $-a_{c-r}$.

In the constant acceleration return phase (comprised between time instants $t_5$ and $t_8$), the cutting slide 2 is structured to move in a direction opposite to the advancement direction X at a speed $V_c$ (negative because the speed $V_c$ has a direction opposite to the advancement direction X) linearly increasing in absolute value from the null value to a maximum return speed value $v_{c\_max-r}$ (smaller than zero) and thus with a constant acceleration (negative) having an absolute value equal to the absolute value of the return acceleration $a_{c-r}$, as shown by the solid lines in FIG. 4A and FIG. 4B between time instants $t_6$ and $t_7$. The term "maximum return speed $v_{c\_max\text{-}r}$." means the maximum value that the speed $V_c$ of the cutting slide 1 has in the direction opposite to the advancement direction X in the return phase of the cutting cycle.

The absolute value of the maximum return speed $v_{c\_max\text{-}r}$ is selected so as to be the highest possible compatibly with the value of the maximum speed $V_{c\_max}$ that the cutting slide 2 can reach, as will be explained in greater detail below in the description of the flow diagram in FIG. 5. It should be observed, in fact, that the absolute value of the maximum return speed $v_{c\_max\text{-}r}$ according to the first embodiment of the disclosure (see point P108 of the speed $V_c$ in FIG. 4A at time instant $t_8$) is greater than the absolute value of the maximum return speed $v_{c\_max\text{-}r}'$ according to the prior art (see for example point P107 of the curve V' in FIG. 4A). For example, the absolute value of the maximum return speed $v_{c\_max}$ according to the disclosure is equal to 90 meters/minute, whereas the absolute value of the maximum return speed $v_{c\_max\text{-}r}'$ according to the prior art is equal to 72 meters/minute.

It important to observe that the value of the area enclosed by the speed $V_c$ of the cutting slide 2 in the forward phase (time instants comprised between $t_0$ and $t_5$ in FIG. 4A) represents the value of the space $S_a$ (i.e. the distance) travelled by the cutting slide 2 in the forward phase and the value of the area enclosed by the speed $V_c$ of the cutting slide 2 in the return phase (time instants comprised between $t_5$ and $t_{11}$ in FIG. 4A) represents the value of the space $S_r$ (i.e. the distance) travelled by the cutting slide 2 in the return phase. The space $S_r$ travelled by the cutting slide 2 in the return phase is equal to the space $S_a$ travelled in the forward phase, so as to allow the cutting slide 2 to return at time instant $t_{11}$ into the same starting position it had at time instant $t_0$ and then to start again with a new cutting cycle in a continuous manner with negligible waiting times: consequently, the area enclosed by the speed $V_c$ in the return phase must be equal to that enclosed by the speed $V_c$ in the forward phase. It is therefore possible to choose the maximum return speed value $v_{c\_max\text{-}r}$ of the cutting slide 2 in an appropriate manner so that the absolute value thereof is greater than the absolute value of the maximum return speed according to the prior art (and in any case less than or equal to the maximum speed $V_{c\_max}$ of the cutting slide 2), provided that an appropriate trend of speed $V_c$ in the time instants comprised between $t_5$ and $t_8$ and between $t_8$ and $t_{11}$ is chosen, so that the value of the area enclosed by the speed $V_c$ in the return phase is equal to the value of the area enclosed by the speed $V_c$ in the forward phase: this will be explained in greater detail below in the description of the flow diagram in FIG. 5.

Figure 1:
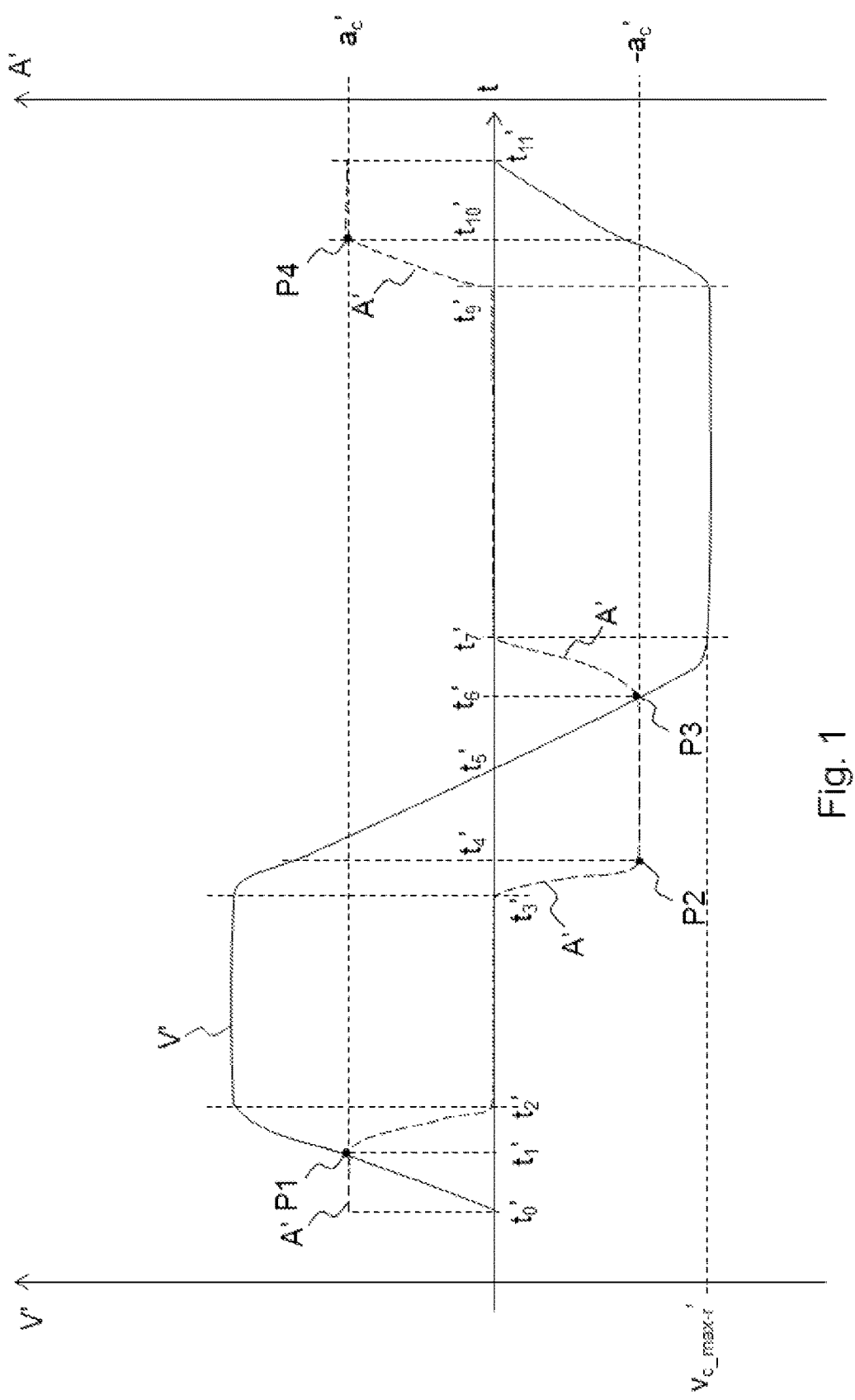
FIG. 1 schematically shows the trend of the speed and acceleration of the cutting slide in a cutting cycle of a machine for continuous-cycle cutting of metal tubes according to the prior art.

It should be observed that in the return phase according to the first embodiment of the disclosure shown in FIG. 4A there is no time interval (see the time instants comprised between $t_5$ and $t_{11}$) wherein the trend of speed $V_c$ of the cutting slide 2 is substantially constant; in contrast, in the return phase according to the prior art there is a phase of non-negligible length (see the time instants comprised between $t_7'$ and $t_9'$ in FIG. 1) wherein the speed trend of the cutting slide 2 is substantially constant.

In the first embodiment of the disclosure in FIG. 4B it is possible to observe that the absolute value of the return acceleration $a_{c\text{-}r}$ in the return phase (point P106 in FIG. 4B) is smaller than the forward acceleration value $a_{c\text{-}a}$ in the forward phase; for example, $a_{c\text{-}a}=15$ m/s$^2$, $a_{c\text{-}r}=0.71$ m/s$^2$. In this way in the return phase the cutting slide 2 moves with a more gradual trend of acceleration Ac: this allows to reduce the mechanical stresses of the moving parts of the cutting machine 50 and thus to reduce the wear thereof, thus improving the reliability of the cutting machine 50.

It is also important to observe that the absolute value of the return acceleration $a_{c\text{-}r}$ is significantly smaller than the absolute value of acceleration $a_c'$ in the return phase according to the prior art (point P3 in FIG. 1); for example, $|-a_c|=15$ m/s$^2$, $a_{c\text{-}r}=0.71$ m/s$^2$. In this way in the return phase of the first embodiment of the disclosure the cutting slide 2 moves with an acceleration $A_c$ having a more gradual trend than in the return phase of the prior art: this allows to reduce the mechanical stresses that the moving parts of the cutting machine 50 (such as, for example, the driving means 4 and the cutting slide 2) are subjected to in the return phase and thus it reduces the wear thereof.

Figure 5:
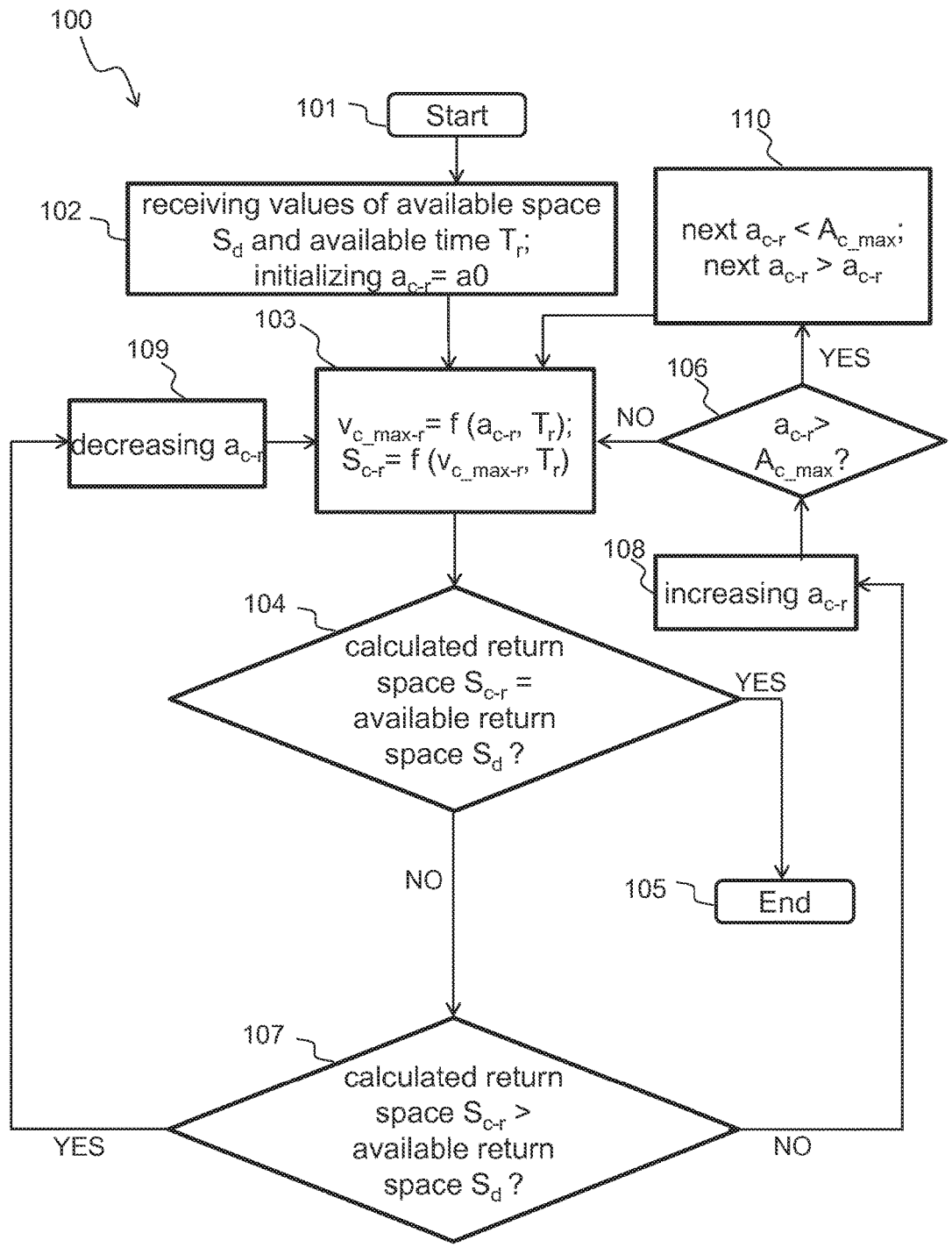
FIG. 5 shows the flow diagram of the method for calculating the maximum return speed of the cutting slide according to the first embodiment of the disclosure.

FIG. 5 shows the flow diagram 100 of the method for calculating the maximum return speed value $v_{c\_max\text{-}r}$ of the cutting slide 2 according to the first embodiment of the disclosure, wherein said method is carried out by the calculating module 6-1 of the processing unit 6.

The flow diagram 100 receives as input the available space $S_d$ for the considered cutting cycle. The available space $S_d$ represents the space $S_r$ travelled by the cutting slide 2 in the return phase with a rectilinear motion in a direction opposite to the advancement direction X. As explained previously, the value of the space $S_r$ travelled by the cutting slide 2 in the return phase is equal to the value of the space $S_a$ travelled by the cutting slide 2 in the forward phase (the latter with a rectilinear motion in a same direction as the advancement direction X), so as to allow the cutting slide 2 to return into the same starting position of the considered cycle. Consequently, the value of the available space $S_d$ is known and it is equal to the value of the space $S_a$ travelled by the cutting slide 2 in the forward phase, by means of an integral operation of the speed $V_c$ of the cutting slide 2 in the forward time interval $T_a$.

The flow diagram 100 also receives as input the value of the return time interval $T_r$, i.e. the value of the time available in the return phase for the cutting slide 2 to return into the starting position.

The value of the return time interval $T_r$ is calculated in the following manner:
- it is assigned the value of the cutting length $L_{prod}$, i.e. the value of the desired length of the cut tubes obtained from the tube 10 (for example, $L_{prod}=6$ meters);
- it is assigned the value of the line speed $V_l$ of the conveyor belt 1 (for example, $V_l=2.67$ meters/second)+;
- it is calculated the value of the length $T_c$ of the cutting cycle, as a function of the values of the cutting length $L_{prod}$ and of the line speed $V_l$ (for example, $T_c=2.25$ s);
- it is assigned the value of the cutting time $T_s$, as a function of the properties of the tube 10 (for example, $T_s=0.686$ seconds);
- it is calculated the value of the forward time interval $T_a$ so that it is sufficiently greater than the value of the cutting time $T_s$ to allow the cutting of the tube 10;
- it is calculated the value of the return time interval $T_r$ by means of the difference between the value of the length $T_c$ of the cutting cycle and the value of the forward time interval $T_a$.

The flow diagram 100 performs an iterative method to calculate the value of the maximum return speed $v_{c\_max\text{-}r}$ by means of the iterative variation of the return acceleration value $a_{c\text{-}r}$.

Therefore, at the start the value of the return acceleration $a_{c\text{-}r}$ is initialized at an initial value a0, which is selected in an appropriate manner. In particular, the initial value a0 is equal to a value that is smaller than the maximum acceleration $A_{c\_max}$ which the cutting slide 2 can have according to the technology used.

The flow diagram 100 begins with step 101.

From step 101 one continues to step 102, wherein the value of the available space $S_d$ is received and wherein the return acceleration value $a_{c-r}$ is initialized at the value a0, i.e. $a_{c-r}$=a0.

From step 102 one continues to step 103, wherein a calculation is first made of the current value of the maximum return speed $v_{c\_max-r}$ as a function of the current value of the return acceleration $a_{c-r}$ (equal to a0 in the first iteration) and as a function of the value of the return time interval $T_r$. In particular, in the first iteration $V_{c\_max-r}=a_{c-r} \times T_r=a0 \times T_r/2$.

Moreover, in step 103 it is calculated the current value of the return space $S_{c-r}$ which the cutting slide 2 would travel in the return phase as a function of the current calculated value of the maximum return speed $V_{c\_max-r}$ and as a function of the return time interval $T_r$. In particular, $S_{c-r}=(v_{c\_max-r} \times T_r)/2$.

From step 103 one continues to step 104 wherein it is verified whether the current calculated value of the return space $S_{c-r}$ is equal to the value of the available space $S_d$:

in the positive case, one continues to step 105;
in the negative case one continues to step 107.

In step 105 the flow diagram ends: therefore, the current calculated value of the maximum return speed $v_{c\_max-r}$ is the maximum value of the maximum return speed $v_{c\_max-r}$ which is used to control the movement of the cutting slide 2 in the return phase, the distance travelled being equal to the calculated value of the return space $S_{c-r}$ (equal to the available space $S_d$).

In step 107 it is verified whether the current calculated value of the return space $S_{c-r}$ is greater than the value of the available space $S_d$:

in the negative case, one continues to step 108;
in the positive case, one continues to step 109.

In step 109 the return acceleration value $a_{c-r}$ is decreased.

From step 109 one continues to step 103 and then step 103 is repeated using a value which is smaller than the return acceleration $a_{c-r}$, i.e. calculating a new value of the maximum return speed $v_{c\_max-r}$ and calculating a new value of the return space $S_{c-r}$.

In step 108 the return acceleration value $a_{c-r}$ is increased.

From step 108 one continues to step 106, wherein it is verified whether the current value of the return acceleration $a_{c-r}$ is greater than the value of the maximum acceleration $A_{c\_max}$:

in the negative case (i.e. $a_{c-r} \leq A_{c\_max}$), one continues to step 103, wherein a value greater than the return acceleration $a_{c-r}$ is used, i.e. a new value of the maximum return speed $v_{c\_max-r}$ is calculated and a new value of the return space $S_{c-r}$ is calculated;
in the positive case (i.e. $a_{c-r} > A_{c\_max}$), one continues to step 110.

In step 110 a calculation is performed of the next value (i.e. a new value) of the return acceleration $a_{c-r}$, wherein the new return acceleration value $a_{c-r}$ is smaller than the maximum acceleration $A_{c\_max}$ and is greater than the current value of the return acceleration $a_{c-r}$.

From step 110 one continues to step 103 wherein it is used the next value of the return acceleration $a_{c-r}$ calculated in the previous step 110.

The cycle composed of steps 103, 104, 107, 109 (or 103, 104, 107, 108, 106) is repeated one or more times until it is found, in step 104, that the current calculated value $S1_{c-r}$ of the return space $S_{c-r}$ is equal to the value of the available space $S_d$; in other words, the calculated value of the return space $S_{c-r}$ represents the condition for exiting the iterative cycle and this occurs when the current value of the return acceleration $a_{c-r}$ is such to determine a current value of the return space $S_{c-r}$ that is equal to the value of the available space $S_d$. At this time the flow diagram 100 ends (step 105) and the last calculated value of the maximum return speed $v_{c\_max-r}$ is the maximum value of the maximum return speed $v_{c\_max-r}$ that is used to control the movement by the cutting slide 2 in the return phase, with the distance travelled being equal to the last calculated value of the return space $S_{c-r}$ (i.e. the distance travelled being equal to the value of the available space $S_d$).

Figure 6A:
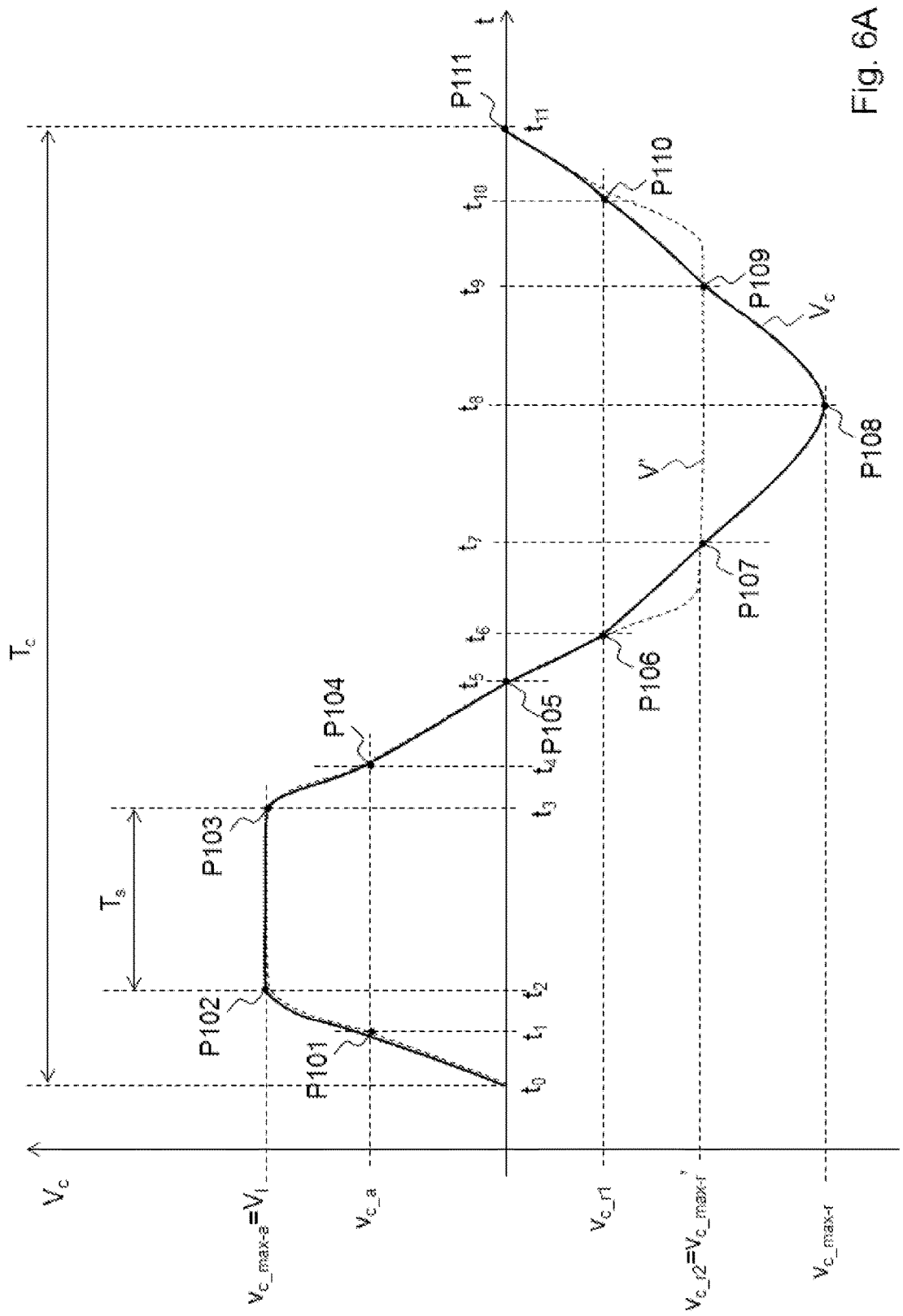
FIG. 6A schematically shows the speed trend of the cutting slide in a cutting cycle of a cutting machine according to a second embodiment of the disclosure (solid line) and according to the prior art (dashed line)

With reference to FIG. 6A, it shows with a solid line a possible trend of the speed $V_c$ of the cutting slide 2 in a cutting cycle having a length $T_c$ according to a second embodiment of the disclosure and FIG. 6B shows with a solid line $A_c$ a possible trend of the corresponding acceleration of the cutting slide 2 in the same cutting cycle.

According to the second embodiment, the memory 6-2 is configured to further store the forward rounding value $v_{c\_a}$, the first return rounding value $v_{c\_r1}$ and the second return rounding value $v_{c\_r2}$. Moreover, the calculating module 6-1 of the second embodiment differs from the calculating module 6-1 of the first embodiment in that it further reads, from the memory 6-2, the forward rounding value $v_{c\_a}$, the first return rounding value $v_{c\_r1}$ and the second return rounding value $v_{c\_r2}$, and in that it also calculates the trends of speed Vc and of the acceleration $A_c$ of the cutting slide 2 further taking into account the forward rounding value $v_{c\_a}$, the first return rounding value $v_{c\_r1}$ and the second return rounding value $v_{c\_r2}$.

Each cutting cycle of the second embodiment comprises the forward phase comprised between time instants $t_0$ and $t_5$ and comprises the return phase comprised between time instants $t_5$ and $t_{11}$.

The forward phase is divided in turn into the following sub-phases (i.e. time intervals):

a first phase of constant acceleration comprised between time instants $t_0$ and $t_1$;
a second rounding phase comprised between time instants $t_1$ and $t_2$;
a third cutting phase comprised between time instants $t_2$ and $t_3$;
a fourth rounding phase comprised between time instants $t_3$ and $t_4$;
a fifth phase of constant deceleration comprised between time instants $t_4$ and $t_5$.

In the first phase of constant acceleration (comprised between time instants $t_0$ and $t_1$) the cutting slide 2 is structured to move in a direction parallel to the advancement direction X at a speed $V_c$ linearly increasing from the null value to a value $v_{c\_a}$ and thus with a constant acceleration $A_c$ equal to a first forward acceleration value $a_{c-a1}$, shown by the solid lines in FIG. 6A and FIG. 6B respectively between time instants $t_0$ and $t_1$.

In the second rounding phase (comprised between time instants $t_1$ and $t_2$) the cutting slide 2 is structured to continue moving along the advancement direction X at a speed Vc gradually increasing from the value $v_{c\_a}$ to a value of maximum forward speed $v_{c\_max-a}$ and thus with an acceleration $A_c$ having a trend of gradually decreasing (i.e. a reduction of the acceleration $A_c$) from the first forward acceleration value $a_{c-a1}$ to the null value, as shown by the solid lines in FIG. 6A and FIG. 6B respectively between time instants $t_1$ and $t_2$. The term "maximum forward speed $v_{c\_max-a}$" means the maximum value that the speed of the cutting slide 1 has along the direction parallel to the advancement direction X in the forward phase of the cutting cycle.

At time instant $t_2$ the cutting slide is situated in the proximity to the tube 10 with the cutting means 2 positioned above it and in the position calculated for cutting the tube 10 to the cutting length $L_{prod}$.

It should be observed that the value of maximum forward speed $v_{c\_max\text{-}a}$ of the cutting slide 2 is equal to the value of the line speed $V_l$ of the conveyor belt 1 (and thus of the tube 10 positioned thereupon): in this way starting from time instant $t_2$ the movement of the cutting slide 2 is synchronized with the movement of the conveyor belt 1 and thus of the tube 10.

In particular, the value $v_{c\_a}$ (defined below as "forward rounding" of the speed $V_c$ of the cutting slide 2) is calculated as a percentage of the value of maximum forward speed $V_{c\_max\text{-}a}$ of the cutting slide 2. For example, $v_{c\_max\text{-}a}=151$ meters/minute, the percentage is equal to 25% and thus the value of $v_{c\_a}$ is 75% (100%-25%) of 151 meters/minute, i.e. $v_{c\_a}=113.25$ meters/minute.

In one embodiment, the trend of speed $V_c$ of the cutting slide 2 in the first rounding phase is selected among one of the following functions:
linear function;
second degree polynomial function;
sinusoidal function;
seventh degree polynomial function;
cycloid.

In the third cutting phase (having a length $T_S$ comprised between time instants $t_2$ and $t_3$) the cutting slide 2 continues to have a rectilinear movement along the direction parallel to the advancement direction X and it is synchronized with that of the tube 10, i.e. the cutting slide 2 moves at a constant speed $v_{c\_max\text{-}a}$ equal to the line speed $V_l$ of the conveyor belt 1 (which is in turn equal to the speed at which the tube 10 moves) and thus with an acceleration $A_c$ having a null value, as shown by the solid lines in FIG. 6A and FIG. 6B respectively between time instants $t_2$ and $t_3$: in this way the cutting means 3 positioned on the cutting slide 2 can perform in the cutting time $T_S$ the cutting of the tube 10 in a calculated point of the length thereof while it is moving on the conveyor means 1. It should be observed that the cutting of the tube 10 can take place using all of the cutting time $T_s$ or only a part thereof.

In the fourth rounding phase (comprised between time instants $t_3$ and $t_4$) the cutting slide 2 is structured to continue moving in the direction parallel to the advancement direction X at a speed Vc gradually decreasing from the value $v_{c\_max\text{-}a}$ to the value $v_{c\_a}$ (i.e. a reduction of the speed $V_c$) and thus with a negative acceleration $A_c$ (because the acceleration $A_c$ has a direction opposite to the direction of the speed $V_c$) having a trend of gradually decreasing (i.e. a deceleration gradually increasing in absolute value) from the null value to a second forward acceleration value $a_{c\text{-}a2}$ (smaller than zero), as shown by the solid lines in FIG. 6A and FIG. 6B respectively between time instants $t_3$ and $t_4$; in this way at time instant $t_4$ the acceleration of the cutting slide 2 has reached the second forward acceleration value $a_{c\text{-}a2}$ (point P5 of FIG. 6B).

It should be observed that, for the sake of simplicity, the value of the speed of the cutting slide 2 at time instant $t_4$ is considered equal to the value at time instant $t_2$ (i.e. equal to $v_{c\_a}$), but said values can also be different; in the latter case the value of the speed of the cutting slide 2 at time instant $t_4$ is calculated as a different percentage of the value of maximum forward speed $v_{c\_max\text{-}a}$ of the cutting slide 2.

In one embodiment, the trend of speed $V_c$ of the cutting slide 2 in the second rounding phase is selected among one of the following functions:
linear function;
second degree polynomial function;
sinusoidal function;
seventh degree polynomial function;
cycloid.

In the fifth phase of constant deceleration (comprised between time instants $t_4$ and $t_5$), the cutting slide 2 is structured to move along the advancement direction X at a speed Vc linearly decreasing from the value $V_{c\_a}$ to the null value and thus with a constant deceleration $A_c$ equal to the second forward acceleration value $a_{c\text{-}a2}$, as shown by the solid lines in FIG. 6A and FIG. 6B respectively between time instants $t_4$ and $t_5$; in this way at time instant $t_5$ the speed $V_c$ of the cutting slide 2 has reached the null value.

It should be observed that the absolute value of the second forward acceleration value $a_{c\text{-}a2}$ is equal to that of the first forward acceleration value $a_{c\text{-}a1}$. Alternatively, the absolute value of the second forward acceleration value $a_{c\text{-}a2}$ is different from the absolute value of the first forward acceleration value $a_{c\text{-}a1}$.

In the return phase, the cutting slide 2 is structured to move in a direction parallel to the advancement direction X in a direction opposite to the movement direction of the conveyor belt 1 (and thus of the tube 10), so as to return to the starting position of the cutting cycle considered (i.e. the one it had at time instant $t_0$) with an appropriate trend of its speed $V_c$ and of its acceleration $A_c$.

It should be observed that in the return phase according to the second embodiment of the disclosure shown in FIG. 6A there is no time interval (see the time instants comprised between $t_7$ and $t_9$) wherein the trend of speed $V_c$ of the cutting slide 2 is substantially constant; in contrast, in the return phase according to the prior art there is a phase of non-negligible length (see the time instants comprised between $t_7'$ and $t_9'$ of FIG. 1) wherein the speed trend of the cutting slide 2 is substantially constant.

The return phase is divided in turn into the following sub-phases (i.e. time intervals):
a sixth rounding phase comprised between time instants $T_5$ and $T_6$;
a seventh phase of constant acceleration comprised between time instants $t_6$ and $t_7$;
an eighth rounding phase comprised between time instants $t_7$ and $t_8$;
a ninth rounding phase comprised between time instants $t_8$ and $t_9$;
a tenth phase of constant deceleration comprised between time instants $t_9$ and $t_{10}$;
an eleventh rounding phase comprised between time instants $t_{10}$ and $t_{11}$.

At time instants $t_5$, the cutting slide 2 starts moving in the direction opposite to the advancement direction X so as to return into the starting position it had at time instant $t_0$.

In the sixth rounding phase (comprised between time instants $t_5$ and $t_6$), the cutting slide 2 is structured to move in the direction opposite to the advancement direction X at a speed $V_c$ (negative because the speed $V_c$ has a direction opposite to the advancement direction X) gradually increasing in absolute value from the null value to a value $v_{c\_r1}$ (smaller than zero) and thus with an acceleration $A_c$ (negative) having a gradually decreasing trend from the second forward acceleration value $a_{c\text{-}a2}$ to a first return acceleration value $a_{c\text{-}r1}$ (smaller than zero, wherein the absolute value of $a_{c\text{-}r1}$ is smaller than the absolute value of $a_{c\text{-}a2}$), as shown by the solid lines in FIG. 6A and FIG. 6B respectively between time instants $t_5$ and $t_6$; in this way at time instant $t_6$ the speed $V_c$ has reached the value $v_{c\_r1}$ and the acceleration $A_c$ has reached the first return acceleration value $a_{c-r1}$.

In particular, the value $v_{c\_r1}$ (defined below as "first return rounding value" of the speed $V_c$ of the cutting slide 2) is calculated as a percentage of the maximum return speed value $v_{c\_max-r}$ of the cutting slide 2. For example, $v_{c\_max-r}$=−90 meters/minute, the percentage is equal to 50% and thus the value of $v_{c\_r1}$ is 50% (100%-50%) of −90 meters/minute, i.e. $v_{c\_r1}$=45 meters/minute.

In one embodiment, the trend of speed $V_c$ of the cutting slide 2 in the sixth rounding phase is selected among one of the following functions:

linear function;
second degree polynomial function;
sinusoidal function;
seventh degree polynomial function;
cycloid.

In the seventh phase of constant acceleration (comprised between time instants $t_6$ and $t_7$), the cutting slide 2 is structured to continue moving in the direction opposite to the advancement direction X at a speed Vc (still negative) linearly increasing in absolute value from the value $v_{c\_r1}$ to a value $v_{c\_r2}$ ($v_{c\_r2}$ smaller than zero, wherein the absolute value of $v_{c\_r2}$ is greater than the absolute value of $v_{c\_r1}$, and thus with a constant acceleration equal to the first return acceleration value $a_{c-r1}$, as shown by the solid lines in FIG. 6A and FIG. 6B between time instants $t_6$ and $t_7$.

In particular, the value $V_{c\_r2}$ (defined below as "second return rounding value" of the speed $V_c$ of the cutting slide 2) is calculated as a percentage of the maximum return speed value $V_{c\_max-r}$ of the cutting slide 2. For example, $V_{c\_max-r}$=−90 meters/minute, the percentage is equal to 20% and thus the value of $v_{c\_r2}$ is 80% (100%-20%) of $V_{c\_max-r}$, i.e. $v_{c\_r2}$=−72 meters/minute.

In the second embodiment of the disclosure in FIG. 6B it is possible to observe that the absolute value of the first return acceleration value $a_{c-r1}$ in the return phase (point P106 of FIG. 6B) is smaller than both the first forward acceleration value $a_{c-a1}$ in the forward phase (point P101) and the absolute value of the second forward acceleration value $a_{c-a2}$ (point P5): for example, $a_{c-a1}$=|$a_{c-a2}$|=15 m/s², |$a_{c-r1}$|=0.71 m/s². In this way in the sixth sub-phase (time instants between $t_5$ and $t_6$) and in the seventh sub-phase (time instants between $t_6$ and $t_7$) of the return phase the cutting slide 2 moves with a more gradual trend of acceleration Ac: this allows to reduce the mechanical stresses of the moving parts of the cutting machine 50 and thus it reduces the wear thereof, thus improving the reliability of the cutting machine 50.

Moreover, it is important to observe that the absolute value of the first return acceleration value $a_{c-r1}$ is significantly smaller than the absolute value of the acceleration value $a_c'$ in the return phase according to the prior art (point P3 of FIG. 1); for example, |−$a_c'$|=15 m/s², |$a_{c-r1}$|=0.71 m/s². In this way the cutting slide 2 in the sixth sub-phase (time instants between $t_5$ and $t_6$) and in the seventh sub-phase (time instants between $t_6$ and $t_7$) of the return phase according to the second embodiment of the disclosure moves with an acceleration $A_c$ having a trend which is more gradual than that of the return phase of the prior art: this allows to reduce the mechanical stresses that the moving parts of the cutting machine 50 (such as, for example, the driving means 4 and the cutting slide 2) are subjected to in the return phase and thus it reduces the wear thereof.

In the eighth rounding phase (comprised between time instants $t_7$ and $t_8$), the cutting slide 2 is structured to continue moving in the direction opposite to the advancement direction X at a speed Vc (still negative) gradually increasing in absolute value from the value $v_{c\_r2}$ to a maximum return speed value $V_{c\_max-r}$ (smaller than zero, wherein the absolute value of $V_{c\_max-r}$ is greater than the absolute value of $v_{c\_r2}$) and with an acceleration having a gradual reduction from the first return acceleration value $a_{c-r1}$ to the null value, as shown by the solid lines in FIG. 6A and FIG. 6B respectively between time instants $t_7$ and $t_8$; in this way at time instant $t_8$ the cutting slide 2 has reached the speed value $V_c$ equal to the maximum return speed $V_{c\_max-r}$ and a null acceleration value $A_c$. The term "maximum return speed $v_{c\_max-r}$" means the maximum value that the speed of the cutting slide 1 has in the direction opposite to the advancement direction X in the return phase of the cutting cycle.

The absolute value of the maximum return speed $V_{c\_max-r}$ is selected so as to be the highest possible, compatibly with the value of the maximum speed $V_{c\_max}$ that the cutting slide 2 can reach according to the technology used for the driving means 4 and cutting slide 2, as it will be explained in greater detail below in the description of the flow diagram in FIG. 7. It should be observed, in fact, that the absolute value of the maximum return speed $v_{c\_max-r}$ according to the second embodiment of the disclosure (see point P108 of the speed $V_c$ in FIG. 6A at time instant $t_8$) is greater than the absolute value of the maximum return speed $v_{c\_max-r}'$ according to the prior art (see for example point P107 of the curve V' in FIG. 6A at the same time instant $t_8$). For example, the absolute value of the maximum return speed $V_{c\_max-r}$ according to the disclosure is equal to 90 meters/minute, whereas the absolute value of the maximum return speed $v_{c\_max-r}'$ according to the prior art is equal to 72 meters/second.

It is important to observe that the value of the area enclosed by the speed $V_c$ of the cutting slide 2 in the forward phase (time instants comprised between $t_0$ and $t_5$ in FIG. 6A) represents the value of the space $S_a$ travelled by the cutting slide 2 in the forward phase and the value of the area enclosed by the speed $V_c$ of the cutting slide 2 in the return phase (time instants comprised between $t_5$ and $t_{11}$ in FIG. 6A) represents the value of the space $S_r$ travelled by the cutting slide 2 in the return phase. The space $S_r$ travelled by the cutting slide 2 in the return phase is equal to the space $S_a$ travelled in the forward phase, so as to allow the cutting slide 2 to return at time instant $t_{11}$ into the same starting position it had at time instant $t_0$ and then to start again with a new cutting cycle in a continuous manner and with negligible waiting times: consequently, the area enclosed by the speed $V_c$ in the return phase must be equal to that enclosed by the speed $V_c$ in the forward phase. It therefore possible to choose the maximum return speed value $v_{c\_max-r}$ of the cutting slide 2 in an appropriate manner so that the absolute value thereof is greater than the absolute value of the maximum return speed according to the prior art (and in any case smaller than or equal to the maximum speed $V_{c\_max}$ of the cutting slide 2), provided that an appropriate trend of speed $V_c$ in the time instants comprised between $t_5$ and $t_8$ and between $t_8$ and $t_{11}$ is chosen so that the value of the area enclosed by the speed $V_c$ in the return phase is equal to the value of the area enclosed by the speed $V_c$ in the forward phase: this will be explained in greater detail below in the description of the flow diagram in FIG. 7.

In particular, the value $V_{c\_r2}$ of the speed of the cutting slide 2 is calculated as a percentage of the maximum return speed value $v_{c\_max-r}$ of the cutting slide 2.

In one embodiment, the trend of speed $V_c$ of the cutting slide 2 in the eighth rounding phase is selected among one of the following functions:
- linear function;
- second degree polynomial function;
- sinusoidal function;
- seventh degree polynomial function;
- cycloid.

In the ninth rounding phase (comprised between time instants $t_8$ and $t_9$) the cutting slide 2 is structured to continue moving in the direction opposite to the advancement direction X at a negative speed $V_c$ gradually decreasing in absolute value from the maximum return speed value $v_{c\_max\text{-}r}$ to the value $v_{c\_r2}$ and thus with an acceleration having a gradually increasing trend (or a gradually increasing deceleration) from the null value to a second return acceleration value $a_{c\text{-}r2}$, as shown by the solid lines in FIG. 6A and FIG. 6B respectively between time instants $t_8$ and $t_9$.

It should be observed that, for the sake of simplicity, the value of the speed of the cutting slide 2 at time instant $t_7$ is considered equal to the value at time instant $t_9$ (i.e. $V_{c\_r2}$), but said values can also be different; in the latter case the value of the speed of the cutting slide 2 at time instant $t_4$ will be calculated as a different percentage of the value of maximum forward speed $v_{c\_max\text{-}a}$ of the cutting slide 2.

In one embodiment, the trend of speed $V_c$ of the cutting slide 2 in the ninth rounding phase is selected among one of the following functions:
- linear function;
- second degree polynomial function;
- sinusoidal function;
- seventh degree polynomial function;
- cycloid.

In the tenth phase of constant deceleration (comprised between time instants $t_9$ and $t_{10}$), the cutting slide 2 is structured to continue moving in the direction opposite to the advancement direction X at a negative speed Vc linearly decreasing in absolute value from the value $v_{c\_r2}$ to the value $v_{c\_r1}$ and thus with a constant deceleration equal to the second return acceleration value $a_{c\text{-}r2}$, as shown by the solid lines in FIG. 6A and FIG. 6B between time instants $t_9$ and $t_{10}$.

In the second embodiment of the disclosure it is possible to observe that the absolute value of the second return acceleration value $a_{c\text{-}r2}$ in the return phase (point P9 in FIG. 6B) is smaller than both the first forward acceleration value $a_{c\text{-}a1}$ in the forward phase (point P101), and the absolute value of the second forward acceleration value $a_{c\text{-}a2}$ (point P5): for example, $a_{c\text{-}a1} = |a_{c\text{-}a2}| = 15$ m/s², $a_{c\text{-}r2} = 0.71$ m/s². In this way in the ninth sub-phase (time instants between $t_8$ and $t_9$) and tenth sub-phase (time instants between $t_9$ and $t_{10}$) of the return phase the cutting slide 2 moves with a deceleration that has a more gradual trend: this allows to reduce the mechanical stresses on the moving parts of the cutting machine 50 and thus reduces the wear thereof, thus improving the reliability of the cutting machine 50.

Moreover, it is important to observe that the absolute value of the second return acceleration value $a_{c\text{-}r2}$ is significantly smaller than the absolute value of the acceleration value $a_c'$ in the return phase according to the prior art (point P4 in FIG. 1): for example, $|-a_c'| = 15$ m/s², $a_{c\text{-}r2} = 0.71$ m/s². In this way in the ninth sub-phase (time instants between $t_8$ and $t_9$) and tenth sub-phase (times between $t_9$ and $t_{10}$) of the return phase in the second embodiment of the disclosure the cutting slide 2 moves with an acceleration/deceleration that has a more gradual trend than that of the return phase of the prior art: this allows to reduce the mechanical stresses that the moving parts of the cutting machine 50 (such as, for example, the driving means 4 and the cutting slide 2) are subjected to in the return phase and thus it reduces the wear thereof.

Therefore, it is possible to reduce the stresses that the moving parts of the cutting machine 50 are subjected to in the return phase, while increasing (compared to the prior art) the absolute value of the maximum speed of the cutting slide 2 in the return phase and reducing (compared to the prior art) the absolute value of the maximum acceleration/deceleration of the cutting slide 2 in the same return phase.

In the eleventh rounding phase (comprised between time instants $t_{10}$ and $t_{11}$) the cutting slide 2 is to continue moving in the direction opposite to the advancement direction X at a negative speed $V_c$ gradually decreasing in absolute value from the value $v_{c\_r1}$ to the null value and with an acceleration $A_c$ having a gradually increasing trend from the second return acceleration value $a_{c\text{-}r2}$ to the first forward acceleration value $a_{c\text{-}a1}$, as shown by the solid lines in FIG. 6A and FIG. 6B respectively between time instants $t_{10}$ and $t_{11}$.

At time instant $t_{11}$ the cutting slide 2 has returned into the initial position it had at time instant $t_0$.

It should be observed that for the sake of simplicity the value of the speed of the cutting slide 2 at time instant $t_{10}$ is considered equal to the value at time instant $t_6$ (i.e. $v_{c\_r1}$), but said values can also be between different.

In one embodiment, the trend of speed $V_c$ of the cutting slide 2 in the eleventh rounding phase is selected among one of the following functions:
- linear function;
- second degree polynomial function;
- sinusoidal function;
- seventh degree polynomial function;
- cycloid.

It should be observed that in the second embodiment of the disclosure shown in FIG. 6A, the absolute value of the maximum return speed $V_{c\_max\text{-}r}$ of the cutting slide 2 is also greater than the maximum forward speed $v_{c\_max\text{-}a}$. Alternatively, it is also possible to have a case wherein the absolute value of the maximum return speed $v_{c\_max\text{-}r}$ of the cutting slide 2 is smaller than the maximum forward speed $v_{c\_max\text{-}a}$.

Figure 7:
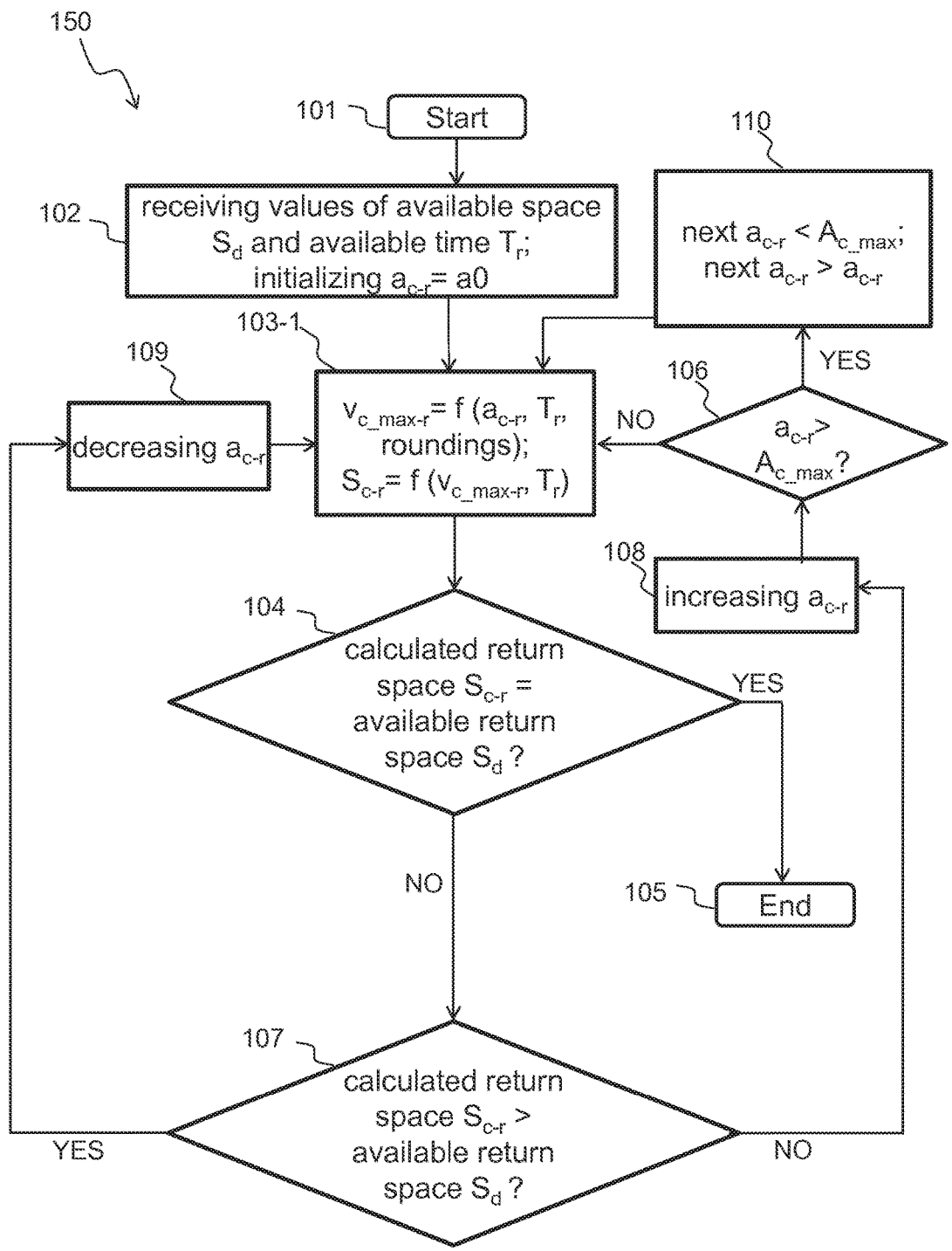
FIG. 7 shows the flow diagram of the method for calculating the maximum return speed of the cutting slide according to the second embodiment of the disclosure.

FIG. 7 shows the flow diagram 150 of the method for calculating the maximum return speed value $v_{c\_max\text{-}r}$ of the cutting slide 2 according to the second embodiment of the disclosure, wherein said method is carried out by the calculating module 6-1 of the processing unit 6.

The flow diagram 150 differs from the flow diagram 100 of the first embodiment of the disclosure in the step 103-1 replacing step 103.

From step 102 one continues to step 103-1 wherein the current value of the maximum return speed $V_{c\_max\text{-}r}$ is calculated, further taking into account the rounding values. Therefore, the current value of the maximum return speed $v_{c\_max\text{-}r}$ is calculated as a function of:
- the current value of the return acceleration $a_{c\text{-}r}$;
- the value of the return time interval $T_r$;
- the value of the forward rounding $v_{c\_a}$;
- the value of the first return rounding value $v_{c\_r1}$;
- the value of the second return rounding value $v_{c\_r2}$.

Therefore, considering equal input values in the flow diagrams 100 and 150, the latter will output different values of the maximum return speed $v_{c\_max\text{-}r}$. In particular, the absolute value of the maximum return speed $v_{c\_max\text{-}r}$ calculated with the flow diagram 150 will be smaller than the absolute value of the maximum return speed $v_{c\_max\text{-}r}$ calculated with the flow diagram 100, but in any case higher than the absolute value of the maximum return speed $v_{c\_max\text{-}r}'$ according to the prior art.

It should be observed that in the first and second embodiments of the disclosure shown in FIGS. 4A and 6A respectively, there is no time interval in the return phase (in contrast to the return phase according to the prior art) wherein the trend of speed $V_c$ of the cutting slide 2 is substantially constant (see for example the trend of speed $V_c$ comprised between time instants $t_7$ and $t_9$ of the second embodiment).

Alternatively, according to a variant of the first and second embodiments of the disclosure, in the return phase there is a non-negligible time interval wherein the trend of speed $V_c$ (solid line) of the cutting slide 2 is substantially constant.

Figure 8:
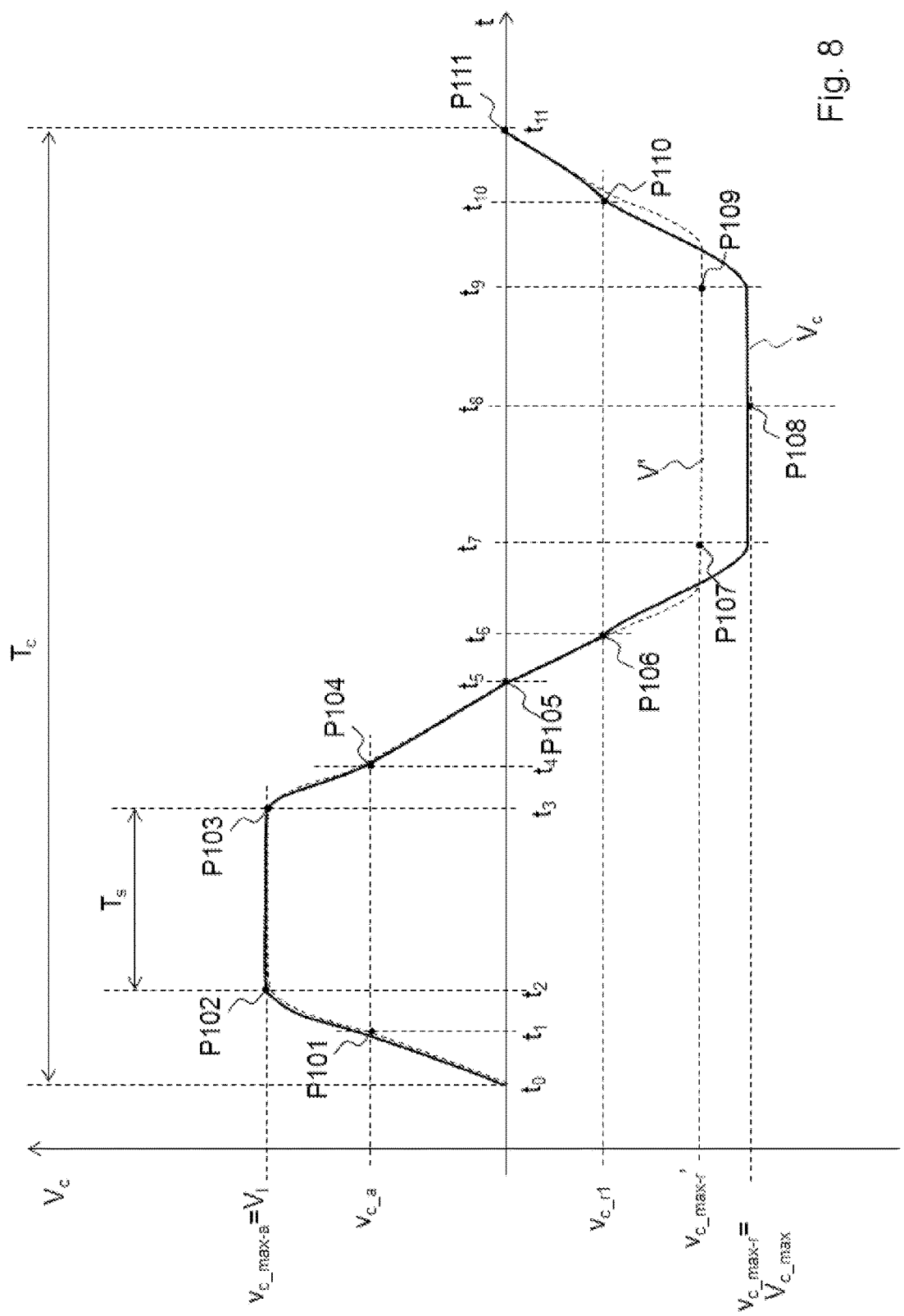
FIG. 8 schematically shows the speed trend of the cutting slide in a cutting cycle of a cutting machine according to a variant of the second embodiment of the disclosure (solid line) and according to the prior art (dashed line)

In particular, with reference to the variant of the second embodiment of the disclosure shown in FIG. 8, in the return phase there is a non-negligible time interval comprised between time instants $t_7$ and $t_9$ wrhein the trend of speed $V_c$ (solid line) of the cutting slide 2 is substantially constant; in particular, the value of the speed $V_c$ in the time interval comprised between time instants $t_7$ and $t_9$ is equal to the value of the maximum speed $V_{c\_max}$ which the cutting slide 2 can reach according to the technology used.

It should be observed that the speed trend V' (shown in FIG. 8 with a dashed line) of the cutting slide in the return phase according to the prior art also has a constant trend (time instants comprised between $t_7'$ and $t_9'$), the difference being that the maximum absolute value $V_{c\_max\text{-}r}$ of the speed $V_c$ in the return phase according to the variant of the second embodiment is greater than the maximum absolute value $v_{c\_max\text{-}r}'$ of the speed V' in the return phase according to the prior art.

Figure 9:
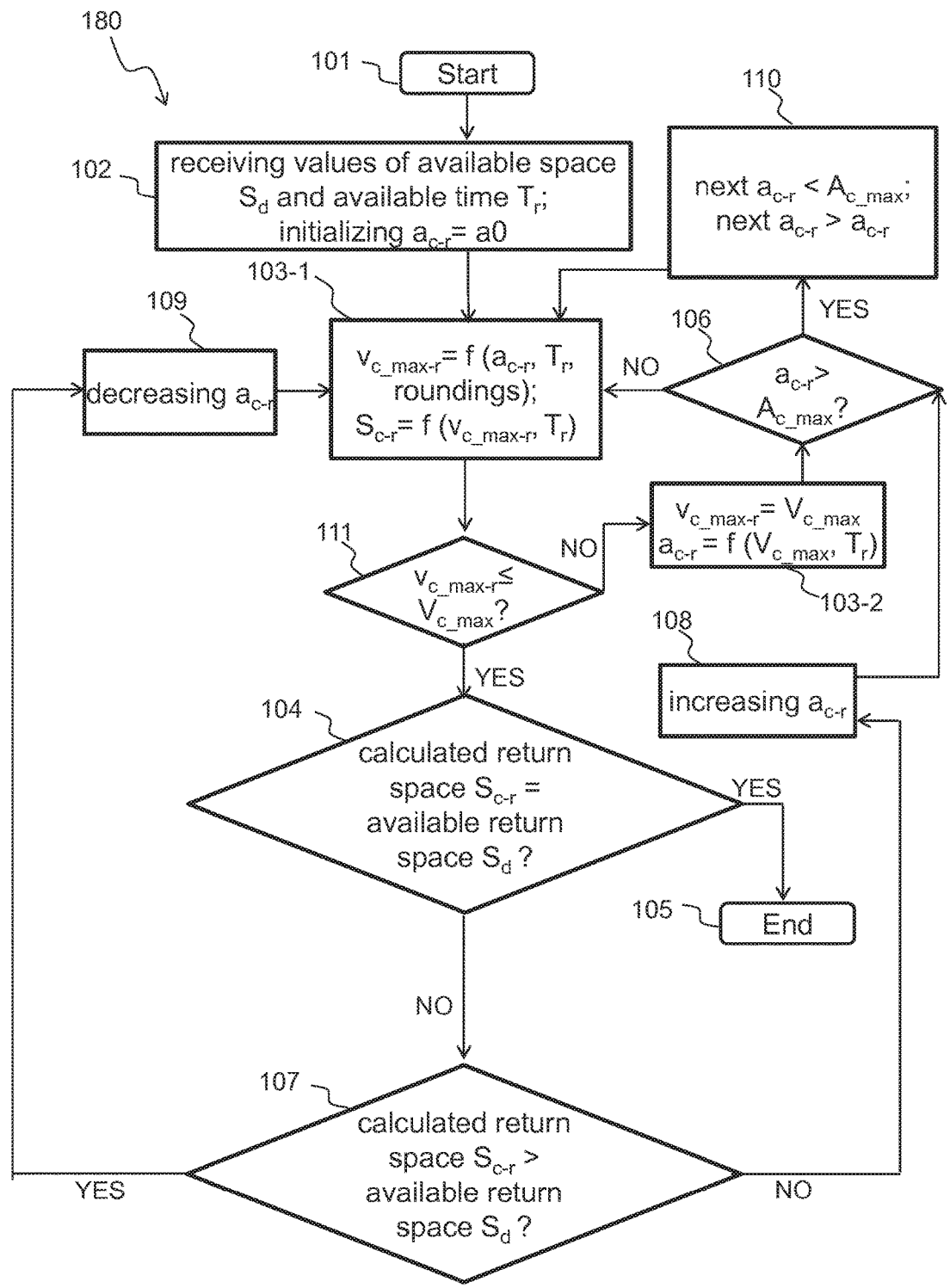
FIG. 9 shows the flow diagram of the method for calculating the maximum return speed of the cutting slide according to the variant of the second embodiment of the disclosure.

FIG. 9 shows the flow diagram 180 of the method for calculating the maximum return speed value $V_{c\_max\text{-}r}$ of the cutting slide 2 according to the variant of the second embodiment of the disclosure, wherein said method is carried out by the calculating module 6-1 of the processing unit 6.

The flow diagram 180 differs from the flow diagram 150 of the second embodiment of the disclosure in the further presence of steps 111 and 103-2.

From step 103-1 one continues to step 111, wherein it is verified whether the current calculated value of the maximum return speed $v_{c\_max\text{-}r}$ is smaller than or equal to the value of the maximum speed $V_{c\_max}$ which the cutting slide 2 can reach according to the technology used:
in the positive case (i.e. $v_{c\_max\text{-}r} \leq V_{c\_max}$), one continues to step 104;
in the negative case (i.e. $v_{c\_max\text{-}r} > V_{c\_max}$), one continues to step 103-2.

In step 103-2 the value of the maximum return speed $v_{c\_max\text{-}r}$ is assigned equal to the value of the maximum speed $V_{c\_max}$, i.e. $v_{c\_max\text{-}r}$; in other words, if the iterative calculation method provides an output value of the maximum return speed $v_{c\_max\text{-}r}$ that is greater than the value of the maximum speed $V_{c\_max}$, the value of the maximum return speed $v_{c\_max\text{-}r}$ is limited so as not to exceed the value of the maximum speed $V_{c\_max}$ and it is assigned equal to the latter.

Moreover, in step 103-2 the return acceleration value $a_{c\text{-}r}$ is calculated as a function of the value of the maximum speed $V_{c\_max}$ and as a function of the return time interval $T_r$.

From step 103-2 one continues to step 106 and thus the flow diagram 180 continues with steps 106, 103-1, 111, 104, 107 (or 106, 110, 103-1, 111, 104, 107) in a manner analogous to what was explained previously in the flow diagram 150 of the second embodiment, the difference being that in step 103-1 the value of the maximum return speed $v_{c\_max\text{-}r}$ is equal to the value of the maximum speed $V_{c\_max}$.

It will now be described the operation of the machine 50 for continuous-cycle cutting of tubes according to the first embodiment of the disclosure, referring also to FIGS. 2, 3, 4A-B and 5.

For the sake of simplicity, it is supposed to use the cutting slide 2 and the driving means 4.

At the initial time instant $t_0$ a first cutting cycle of length $T_c$ begins; the processing unit 6 reads, from the memory 6-2, the values of the usable slide stroke $L_{ut}$, maximum speed $V_{c\_max}$, maximum acceleration $A_{c\_max}$, cutting length $L_{prod}$ and cutting time $T_s$, and calculates the value of the available space $S_d$ for the cutting slide 2 in the return phase and the value of the return time interval $T_r$.

Moreover, at the initial time instant $t_0$ the processing unit 6 calculates the value of the maximum return speed $v_{c\_max\text{-}r}$ of the cutting slide 2 in the return phase, as previously explained in the description of the flow diagram 100 shown in FIG. 5.

In the time instants comprised between $t_0$ and $t_{11}$ the processing unit 6 generates the driving signal $S_{azm}$ which drives the driving means 4, which move the cutting slide 2 with a trend of the speed Vc and of the acceleration $A_c$ as previously explained in the description of FIG. 4A-4B.

At time instant $t_{11}$ the cutting slide 2 has returned into the initial position it had at time instant $t_0$ and the first cutting cycle has ended: a first tube of a length equal to the cutting length $L_{prod}$ has thus been obtained from the tube 10.

Afterwards, at time instant $t_{11}$ a second cutting cycle begins, wherein the operation is equal to that previously described for the first cutting cycle: at the end of the second cutting cycle a second tube of a length equal to the cutting length $L_{prod}$ has been obtained.

The machine 50 then performs further cutting cycles and a plurality of cut tubes of a length equal to the cutting length $L_{prod}$ is thus obtained.

The operation of the second embodiment is analogous to that previously explained for the first embodiment, the difference being that FIG. 6A-6B are considered in place of FIG. 4A-4B and FIG. 7 in place of FIG. 5.

The operation of the variant of the second embodiment is analogous to that of the second embodiment, the difference being that FIG. 8 is considered in place of FIG. 6A-6B and FIG. 9 in place of FIG. 7.

The present disclosure also relates to a method for machining a moving object.

The method comprises the following steps:
providing conveyor means 1 for carrying the object along an advancement direction X at a line speed $V_l$;
providing a driving and cutting unit 7 for performing the cutting of the moving object;
moving the driving and cutting unit 7 according to a forward phase along a direction parallel to the advancement direction with the same direction as the conveyor means direction in order to perform the cut the moving object;
moving the driving and cutting unit, in a return phase subsequent to the forward phase, along a direction parallel to the advancement direction with a direction opposite to the conveyor means direction in order to return to the initial position of the cutting cycle and with an acceleration trend wherein the maximum absolute value of the acceleration within the return phase is smaller than the maximum absolute value of the acceleration within the forward phase.

In one embodiment, the method further comprises:
the step of providing conveyor means comprises providing a cutting slide 2 for moving in the forward and return phases of the cutting cycle and providing driving means 4 for driving the movement of the cutting slide;
the step of moving the driving and cutting unit according to the forward phase comprises the following steps:
moving the cutting slide with an acceleration until reaching a speed value that is substantially equal to the line speed;
moving the cutting slide with a speed substantially equal to the line speed and cutting the moving object;
moving the cutting slide with a deceleration until reaching a substantially null speed value;
the step of moving the driving and cutting unit according to the return phase comprises the following steps;
moving the cutting slide with an acceleration until reaching a speed value that is substantially equal to a maximum return speed;
moving the cutting slide with a deceleration until reaching a substantially null speed value.

In one embodiment, the method further comprises the following steps:
a) receiving values indicating the available return space $S_d$ and return time interval $T_r$ available for the movement of the cutting slide in the return phase;
b) assigning the current value of a return acceleration $a_{c-r}$ in the return phase equal to an initial value a0 which is smaller than the value of a maximum allowed acceleration $A_{c\_max}$ of the cutting slide;
c) calculating the current value of the maximum return speed $v_{c\_max-r}$ as a function of the current value of the return acceleration $a_{c-r}$ and as a function of the value of the return time interval $T_r$;
d) calculating the current value of the return space $S_{c-r}$ as a function of the current calculated value of the maximum return speed $v_{c\_max-r}$ and as a function of the value of the return time interval $T_r$;
e) verifying whether the current calculated value of the return space $S_{c-r}$ is equal to the value of the available space $S_d$;
f) if the current calculated value of the return space $S_{c-r}$ is equal to the value of the available space $S_d$, assigning the value of the maximum return speed $V_{c\_max-r}$ as equal to the current calculated value of the maximum return speed;
g) if the current calculated value of the return space $S_{c-r}$ is different from the value of the available space $S_d$, verifying whether the current calculated value of the return space $S_{c-r}$ is greater than the value of the available space $S_d$;
h) in the positive case, decreasing the value of the return acceleration and repeating steps c), d) and e) using the current value of the return acceleration equal to said decreased value;
i) in the negative case, increasing the return acceleration value and repeating steps c), d) and e) using the current value of the return acceleration equal to said increased value.

In one embodiment, the method further comprises the following steps:
$i_1$) verifying whether the current value of the return acceleration $a_{c-r}$ is greater than the value of an allowed maximum acceleration $A_{c\_max}$ of the cutting slide;
$i_2$) in the negative case, repeating steps c), d), e);
$i_3$) in the positive case, calculating a next value of the return acceleration $a_{c-r}$ smaller than the maximum acceleration $A_{c\_max}$ and greater than the current value of the return acceleration $a_{c-r}$ and repeating the steps c), d), e) using the current value of the return acceleration equal to the next calculated value of the return acceleration.

The invention claimed is:
1. A cutting machine configured for cutting a moving object, the machine comprising:
(a) conveyor means,
(b) a processing unit, and
(c) a driving and cutting unit;
the conveyor means being adapted for carrying the object along an advancement direction at a line speed;
the processing unit being programmed and configured to control the driving and cutting unit so that the driving and cutting unit moves in a cutting cycle having:
(1) a forward phase along a direction parallel to the advancement direction with a same direction as a direction of the conveyor means in order to cut the moving object, and
(2) a return phase subsequent to the forward phase, along the direction parallel to the advancement direction with a direction opposite to the direction of the conveyor means in order to return to an initial position of the cutting cycle;
wherein the processing unit is programmed and configured to generate a driving signal controlling the movement of the driving and cutting unit with an acceleration trend wherein a maximum absolute value of the acceleration within the return phase is smaller than a maximum absolute value of the acceleration within the forward phase;
wherein the driving and cutting unit comprises (a) a cutting slide configured to move in the forward and return phases of the cutting cycle and (b) driving means configured to drive the movement of the cutting slide; wherein the processing unit is further programmed and configured to calculate a trend of the speed of the cutting slide as a function of input parameters and generate said driving signal; wherein the driving signal controls the movement of the cutting slide with said acceleration trend.

2. Cutting machine according to claim 1, wherein the processing unit is further configured to:
generate the driving signal controlling the movement of the cutting slide in the forward phase according to the following trend:
a first forward time interval wherein the cutting slide is configured to move with an acceleration until it reaches a speed value equal to the line speed;
a cutting interval subsequent to the first forward time interval, wherein the cutting slide is configured to move with a speed equal to the line speed and to cut the moving object;
a second forward time interval subsequent to the cutting interval, wherein the cutting slide is configured to move with a deceleration until it reaches a null speed value;
generate the driving signal controlling the movement of the cutting slide in the return phase according to the following trend:
a first return time interval wherein the cutting slide is configured to move with an acceleration until it reaches a speed value equal to a maximum return speed;
a second return time interval subsequent to the first return time interval, wherein the cutting slide is configured to move with a deceleration until it reaches a null speed value; wherein the maximum absolute value of the acceleration within the first return time interval is smaller than the maximum absolute value of the acceleration within the first forward time interval and wherein the maximum absolute value of a deceleration within the second return time interval is smaller than the maximum absolute value of a deceleration within the second forward time interval.

3. Cutting machine according to claim 2, wherein the value of the line speed is equal to a value of the maximum speed of the cutting slide.

4. Cutting machine according to claim 2, wherein the processing unit is further configured to:
  a) receive values indicating a return space available and a return time interval available for the movement of the cutting slide in the return phase;
  b) assign a current value of a return acceleration in the return phase equal to an initial value smaller than a value of a maximum acceleration allowed to the cutting slide;
  c) calculate a current value of the maximum return speed as a function of the current value of the return acceleration and as a function of the value of the return time interval;
  d) calculate a current value of the return space as a function of the calculated current value of the maximum return speed and as a function of the value of the return time interval;
  e) check whether the calculated current value of the return space is equal to a value of an available space;
  f) in case the calculated current value of the return space is equal to the value of the available space, assign the value of the maximum return speed equal to the calculated current value of the maximum return speed;
  g) in case the calculated current value of the return space is different from the value of the available space, check whether the calculated current value of the return space is greater than the value of the available space;
  h) in an affirmative case, reduce the value of the return acceleration and repeat c), d), e) using the current value of the return acceleration equal to said reduced value;
  i) in a negative case, increase the value of the return acceleration and repeat c), d), e) using the current value of the return acceleration equal to said increased value.

5. Cutting machine according to claim 4, wherein the processing unit is further configured to calculate the value of the return space available by means of an integral operation of the speed trend of the cutting slide in the forward phase.

6. Cutting machine according to claim 4, wherein the processing unit is further configured in i) to:
  i1) check whether the current value of the return acceleration is greater than the value of the maximum acceleration of the cutting slide;
  i2) in a negative case, repeat c), d), e);
  i3) in a positive case, calculate next value of the return acceleration smaller than the maximum acceleration of the cutting slide and greater than the current value of the return acceleration and repeat c), d), e) using the current value of the return acceleration equal to the calculated next value of the return acceleration.

7. Cutting machine according to claim 6, wherein the processing unit is configured to further perform, between d) and e):
  d1) check whether the calculated current value of the maximum return speed is smaller than or equal to the value of a maximum speed allowed to the cutting slide;
  d2) in the positive case, continue with e);
  d3) in the negative case, assign the value of the maximum return speed equal to the value of the maximum speed of the cutting slide and calculate the value of the return acceleration as a function of the value of the maximum speed of the cutting slide and of the return time interval;
  d4) continue with i1).

8. Cutting machine according to claim 4, wherein the processing unit is further configured to generate the driving signal controlling the movement of the cutting slide in the return phase according to the following trend:
  a first return rounding time interval preceding the first return time interval, wherein the cutting slide is configured to move with a speed trend gradually increasing in absolute value from a null value to a first return rounding value having an absolute value smaller than an absolute value of the maximum return speed and is configured to move with an acceleration trend having a gradually decreasing trend in absolute value from a second forward acceleration value to a first return acceleration value having an absolute value smaller than an absolute value of the second forward acceleration value;
  said first return time interval wherein the cutting slide is configured to move with a speed trend linearly increasing in absolute value from the first return rounding value to a second return rounding value having an absolute value smaller than the absolute value of the maximum return speed and is configured to move with a constant acceleration equal to the first return acceleration value;
  a second return rounding time interval subsequent to the first return time interval, wherein the cutting slide is configured to move with a speed trend gradually increasing in absolute value from the second return rounding value to the value of the maximum return speed and is configured to move with an acceleration trend having a trend gradually decreasing in absolute value from the first return acceleration value to the null value;
  a third return rounding time interval subsequent to the second return rounding time interval, wherein the cutting slide is configured to move with a speed trend gradually decreasing in absolute value from the value of the maximum return speed to the second return rounding value and is configured to move with an acceleration trend having a trend gradually increasing from the null value to a return acceleration value smaller than a first forward acceleration value;
  said second return time interval wherein the cutting slide is configured to move with a speed trend linearly decreasing in absolute value from the second return rounding value to the first return rounding value and is configured to move with a constant acceleration trend equal to a second return acceleration value smaller than the first forward acceleration value;
  a fourth return rounding time interval subsequent to the second return time interval, wherein the cutting slide is configured to move with a speed trend gradually decreasing in absolute value from the first return rounding value to the null value and is configured to move with an acceleration trend having a trend gradually increasing from the second return acceleration value to the first forward acceleration value;
wherein the processing unit is configured to calculate in c) the current value of the maximum return speed as a function of the current return acceleration value, of the value of the return time interval, of the first return rounding value and of the second return rounding value.

* * * * *